(12) United States Patent
Shiota et al.

(10) Patent No.: US 6,730,215 B2
(45) Date of Patent: May 4, 2004

(54) APPARATUS FOR TREATING WASTE WATER

(75) Inventors: Yusuke Shiota, Himeji (JP); Tohru Ishii, Hyogo-ken (JP); Kiichiro Mitsui, Akashi (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/147,428

(22) PCT Filed: Apr. 21, 1998

(86) PCT No.: PCT/JP98/01834

§ 371 (c)(1),
(2), (4) Date: Dec. 22, 1998

(87) PCT Pub. No.: WO98/47824

PCT Pub. Date: Oct. 29, 1998

(65) Prior Publication Data

US 2002/0070155 A1 Jun. 13, 2002

(30) Foreign Application Priority Data

| Apr. 22, 1997 | (JP) | 9-103758 |
| Jun. 20, 1997 | (JP) | 9-164550 |
| Sep. 24, 1997 | (JP) | 9-258016 |

(51) Int. Cl.$^7$ ................................. C02F 1/72
(52) U.S. Cl. .................. 210/198.1; 210/205; 210/286; 210/289
(58) Field of Search ..................... 210/198.1, 205, 210/283, 284, 286, 289, 290, 291, 350, 762

(56) References Cited

U.S. PATENT DOCUMENTS

| 3,554,377 A | * | 1/1971 | Miller | 210/283 |
| 3,986,839 A | | 10/1976 | Queiser et al. | 23/288 R |
| 4,233,158 A | * | 11/1980 | Wachsmuth | 210/291 |
| 4,260,426 A | * | 4/1981 | Werfelman | 210/283 |
| 4,865,701 A | * | 9/1989 | Beck et al. | 204/67 |
| 4,896,704 A | | 1/1990 | Aly et al. | 141/9 |
| 5,338,713 A | * | 8/1994 | Takagi et al. | 501/105 |
| 5,518,910 A | * | 5/1996 | Parker et al. | 435/176 |
| 5,534,152 A | * | 7/1996 | Schick | 210/656 |
| 5,601,797 A | | 2/1997 | Gentry | 423/659 |
| 5,650,127 A | * | 7/1997 | Campbell et al. | 423/239.1 |
| 5,972,226 A | * | 10/1999 | Djafer et al. | 210/762 |

FOREIGN PATENT DOCUMENTS

| EP | 0 636 399 | | 2/1995 |
| GB | 2 297 923 | | 8/1996 |
| JP | 5-76880 | * | 3/1993 |
| JP | 6-86990 | * | 3/1994 |
| JP | 8-1147 | * | 1/1996 |
| JP | 9-262592 | * | 10/1997 |
| JP | 10-52686 | * | 2/1998 |
| NL | 9 500 080 | | 9/1995 |
| WO | WO 96/13463 | * | 5/1996 |
| WO | WO 99/03561 | | 1/1999 |

* cited by examiner

*Primary Examiner*—Ivars C. Cintins
(74) *Attorney, Agent, or Firm*—Oblon, Spivak, McClelland, Maier & Neustadt, P.C.

(57) ABSTRACT

The present invention relates to an apparatus including a pressure layer having an ability of following up the deformation or movement of a packed bed of a solid catalyst and/or solid adsorbent which is provided on the packed bed. Specifically, the present invention relates to an apparatus in which a pressure layer having an ability of following up the deformation of the top surface of the solid catalyst packed bed is provided on the packed bed, or in which a water-permeable pressure layer having an ability of following up the deformation of the solid catalyst packed bed is provided on the packed bed. Such pressure layers are effective in sufficiently preventing the solid catalyst from moving in the packed bed. As a result, there is no problem such as the abrasion of solid catalyst mainly caused by its movement, the deterioration of the performance thereof, and an increase in pressure loss, thereby treating waste water in a stable manner for a long period of time.

12 Claims, 12 Drawing Sheets

APPARATUS FOR TREATING WASTE WATER

TECHNICAL FIELD

The present invention relates to an apparatus for treating waste water. Specifically, the present invention relates an apparatus which, when waste water discharged from various industrial plants is treated using a solid catalyst and/or a solid adsorbent (hereinafter, simply referred to as "a solid catalyst" in some cases), effectively prevents the movements of the solid catalyst such as travelling and swinging to solve the problems including the abrasion of the solid catalyst due to the movements, the deterioration of performance thereof, and an increase in pressure loss thereof, thereby treating waste water in a stable manner for a long period of time.

BACKGROUND ART

Waste water, discharged from various industrial plants such as chemical plants, food processing plants, metal processing plants, plating plants, printing plate making plants, and photographic processing plants, has been purified through a method such as a wet-oxidation method, a wet-decomposition method, an ozone-oxidation method, and a peroxide-oxidation method.

In a wet-oxidation method using a reaction tower filled with a solid catalyst for example, in general, waste water and an oxygen-containing gas are introduced into the reaction tower, and are allowed to pass through the solid catalyst packed bed from its bottom, so that the waste water is purified. When a waste water and an oxygen-containing gas are introduced into the solid catalyst packed bed, the movement of the solid catalyst such as travelling and swinging easily occurs. Such a movement inevitably creates a problem such as the abrasion of the solid catalyst, the deterioration of the performance thereof, and an increase of the pressure loss. In particular, when waste water and/or an oxygen-containing gas are allowed to pass through the solid catalyst packed bed at high flow rate in order to increase the treatment efficiency, the abrasion of the solid catalyst becomes large.

The above-described problems arise not only in a wet-oxidation method, but also in other methods including a wet-decomposing method and an ozone-oxidation method as well. In a wet-oxidation method, waste water and an oxygen-containing gas, or only an oxygen-containing gas in some cases, are usually allowed to pass through the solid catalyst packed bed from the bottom thereof. In contrast, in the methods other than the wet-oxidation method, what to introduce into the reaction tower, i.e. only waste water, waste water and gas, or only gas, varies by each method (in this case, the kind of gas used depends on each method.). In the following description, for convenience, "waste water etc.," or simply "waste water" is used as a term representing "waste water and an oxygen-containing gas", "waste water and a gas", "waste water only", "a gas only", and "an oxygen-containing gas only", which are introduced into a solid catalyst packed bed from the bottom thereof.

In order to solve the above-described problems, there has been employed a method in which a fixed pressure member is provided onto the surface of the solid catalyst packed bed. The fixed pressure member, which may be a cover constituted by wire netting, a single-hole or perforated plate, or a grid, presses the solid catalyst from the above so as to prevent its movement.

As a matter of course, there is a case in which nothing is provided onto the solid catalyst packed layer. In this case, however, there is a disadvantage as follows. That is, since no pressure member for preventing the movement of the solid catalyst is provided onto the solid catalyst packed layer, the solid catalyst vigorously moves. Due to the vigorous movement, the problems of the abrasion of the solid catalyst, the deterioration of performance thereof, and an increase in pressure loss become serious. This disadvantage makes it impossible to treat waste water in a stable manner for a long period of time.

For the above reason, in many cases, a fixed pressure member is provided onto a solid catalyst packed bed.

However, when a fixed pressure member, which may be a cover constituted by a wire netting, a single-hole or perforated plate, or a grid, is provided on the solid catalyst packed bed, a problem arises as follows. That is, at the initial stage of waste water treatment, there is no space between the top surface of the solid catalyst packed bed and the bottom surface of the pressure member, and the solid catalyst is properly pressed from the above by the pressure member. However, as the time elapses and the waste water treatment proceeds, it is inevitable that the solid catalyst is compacted in the packed bed or is abraded to lose its volume. The top surface of the solid catalyst packed bed sinks downward, and a space is created between the top surface of the solid catalyst packed bed and the bottom surface of the pressure member. As a result, the solid catalyst vigorously moves, and problems such as the abrasion of solid catalyst, the deterioration of performance thereof, and an increase of pressure loss tend to arise. For this reason, there is a difficulty with the use of a conventional fixed pressure member in treating waste water in a stable manner for a long period of time. Furthermore, when waste water is treated in a reaction tower with a large inner diameter, the use of a conventional fixed pressure member may cause the above-described problems in a short time from the initiation of the waste water treatment.

In addition, in an apparatus in which waste water is introduced into a reaction tower through a nozzle, or a hole of a single-hole or perforated plate and then is discharged from the upper part thereof, there is a disadvantage. That is, the waste water blows off from the nozzle or the hole and strongly collides with the solid catalyst. With the collision of the waste water, the solid catalyst is abraded, and various problems arise with the elapse of time as follows. First, the solid catalyst packed into the reaction tower decreases its volume, and as a result, the performance of the solid catalyst is deteriorated, and the waste water treatment efficiency is lowered. Second, the solid catalyst is abraded, and powder thereof is generated. The powder enters and clogs the space between the solid catalyst particles through which waste water is to flow. As a result, pressure loss increases. Third, a space is created at the bottom area of the solid catalyst packed bed, and with the presence of the space, the solid catalyst easily swings or travels. As a result, the solid catalyst particles collide with each other, and the abrasion thereof is further promoted.

When waste water is treated using a solid catalyst as is the case of the wet-oxidation method described above, instead of charging a solid catalyst directly in a reaction tower, a wire netting is provided at the bottom of a reaction tower and a solid catalyst is charged on the wire netting. There are also cases where, instead of a wire netting, a single-hole or perforated plate or a grid is provided, or alternatively, such a plate or a grid is used together with a wire netting. A wire netting and the like is provided at the bottom of a reaction tower in order to prevent the waste water introduced into the reaction tower from drifting and to allow it to flow uniformly, thereby increasing the treatment efficiency.

However, if the waste water is blown off from the nozzle, or the hole of a single-hole or perforated plate at high linear velocity, the use of the wire netting, the perforated plate, or the grid described is not effective. This problem is especially serious in the case where waste water is treated using gas, in particular in a wet-oxidation method where waste water is treated using a solid catalyst. In such a situation, there has conventionally been difficulty in enhancing the treatment efficiency at increasing the flow rate of the waste water.

The present inventors have conducted studies to find out a method and an apparatus using the method, capable of effectively preventing an abrasion of the solid catalyst, specifically: (1) an abrasion caused by the movement of the solid catalyst in the solid catalyst packed layer; and (2) an abrasion caused by the collision between the solid catalyst and the waste water at the bottom of the solid catalyst packed bed, thereby solving the problems of deterioration of performance of the solid catalyst, deterioration of treatment efficiency, and an increase in pressure loss thereby treating waste water for a long period of time.

As to the abrasion (1), the present inventors have conducted studied on a pressure member capable of following up the sinking of the solid catalyst packed bed, instead of a conventional fixed pressure member. As a result, they have found that it is effective to use different type of a pressure member in accordance with an inner diameter of a reaction tower. That is, when the reaction tower has an inner diameter of about less than 100 mm, and about less than 300 mm at the maximum, it is effective to provide a pressure layer having an ability of following up the movement of the surface of the solid catalyst packed bed thereon (for example, the pressure member is constituted by metal in the form of a stick, an agglomerate, or a column. Its surface coming into contact with the top surface of the solid catalyst packed bed is constituted by wire netting, plate, and the like. The pressure layer has such a size as to just fit inside the reaction tower). Contrary to this, when the reaction tower has a large inner diameter, specifically, 100 mm or larger, 300 mm or larger, and still 600 mm or larger, it is effective to provide a water-permeable pressure layer having an ability of following up the deformation of the solid catalyst packed bed thereon (for example, the pressure layer is capable of deforming so as to sufficiently follow up the deformation of the top surface of the packed bed such as sinking, thereby substantially preventing the creation of a space between the pressure layer and the top surface of the packed bed. The pressure layer is a packed bed of substance in the form of, for example, a sphere, a pellet, and the like.).

When the reaction tower has far larger inner diameter, specifically 350 mm or larger, and still 510 mm or larger, the above-described problem (1) can be effectively solved by providing a partition for dividing the packed bed as the pressure layer into a plurality of segments in a vertical direction.

As to the abrasion (2), that is, an abrasion of the solid catalyst caused by the collision with the waste water introduced from the bottom of the reaction tower, the present inventors have found that it is effective to provide a layer capable of dispersing and mitigating the upward stream of the waste water under the solid catalyst packed bed. The layer is, for example, a packed bed of metal or ceramics.

DISCLOSURE OF INVENTION

The present invention has solved the above-described problems, and provides an apparatus having a structure in which a pressure layer capable of following up the deformation or movement of a surface of a packed bed of a solid catalyst and/or a solid adsorbent is provided on the packed bed (there are some cases where the pressure layer is referred to as "an upper packed bed".).

Specifically, according to the first embodiment of the present invention which has solved the above-described problems (i.e. a first configuration), a water-permeable pressure layer having an ability of following up the deformation of the top surface of the packed bed of the solid catalyst and/or the solid adsorbent is provided on the packed bed (The water-permeable pressure layer is an example of the above-described "upper packed bed". In order to specify the water-permeable pressure layer among various examples of the upper packed bed, there are some cases where the water-permeable pressure layer is referred to as "an upper deformation packed bed".).

According to the second embodiment of the apparatus of the present invention (a second configuration), the above-described upper deformation packed bed is provided on the packed bed of the solid catalyst and/or the solid adsorbent, in addition, the upper part of the solid catalyst packed bed and the upper deformation packed bed are divided into a plurality of segments by a partition in a vertical direction.

According to the third embodiment of the apparatus of the present invention (a third configuration), a layer for dispersing and mitigating the upward stream of waste water and/or gas (hereinafter, simply referred to as "waste water" again.) is provided under the packed bed of the solid catalyst and/or the solid adsorbent (there are some cases where the dispersing and mitigating layer is referred to as "a lower packed bed".).

According to the fourth configuration of the present invention, the lower packed bed is provided under the packed bed of the solid catalyst and/or the solid adsorbent, in addition, the upper deformation packed bed is provided on the packed bed of the solid catalyst and/or the solid adsorbent. The present invention also includes the fifth configuration in which the fourth apparatus is further provided with a partition for dividing the upper part of the solid catalyst packed bed and the upper deformation packed bed into a plurality of segments in a vertical direction.

According to a sixth embodiment of the apparatus of the present invention which has solved the above-described problems (a sixth configuration), a pressure layer having an ability of following up the movement of the packed bed of the solid catalyst and/or the solid adsorbent (the pressure layer is an example of the above-described "upper deformation packed bed". In order to distinguish the pressure layer from the upper deformation packed bed in the first configuration, there are some cases where the pressure layer is referred to as "an upper movement packed bed".).

The present invention also includes the seventh configuration in which the upper movement packed bed is provided on the packed bed of the solid catalyst and/or the solid adsorbent, in addition, the lower packed bed is provided under the packed bed of the solid catalyst and/or the solid adsorbent.

DESCRIPTION OF REFERENCE NUMERALS

Figure 1:
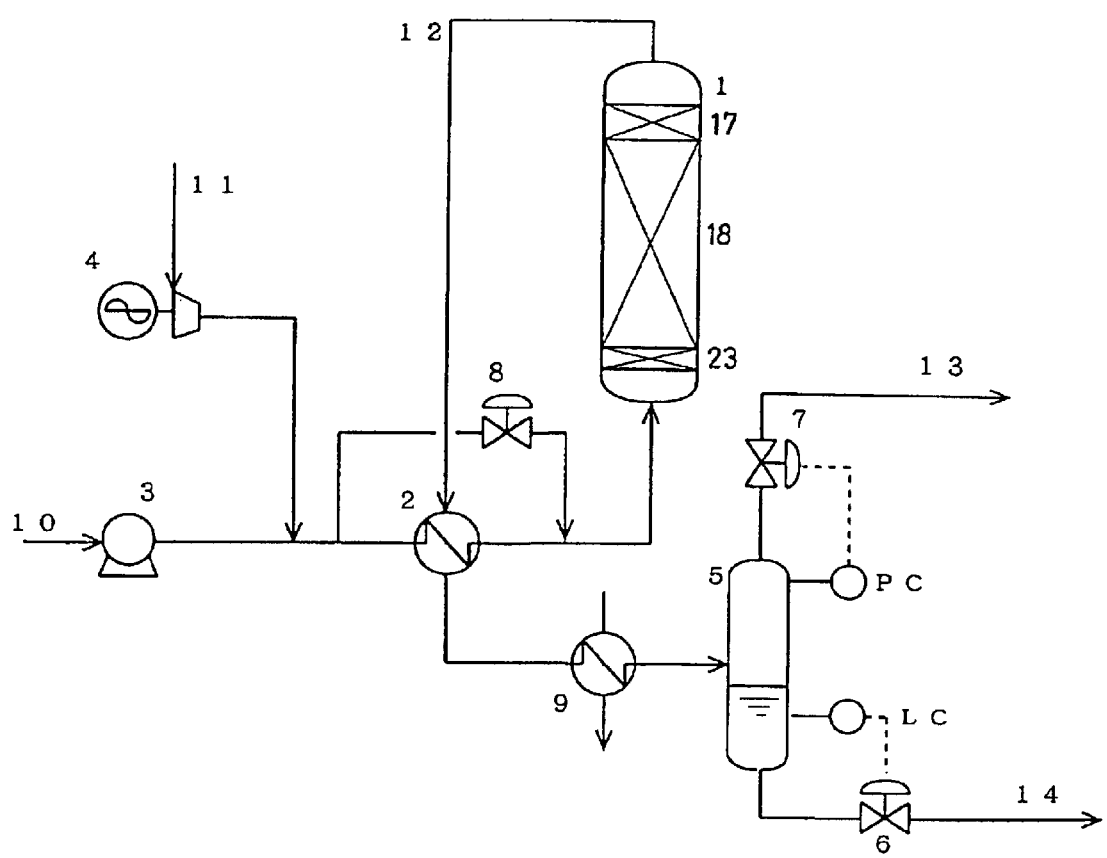
FIG. 1 is a schematic diagram showing a method for treating waste water using an apparatus of the present invention.

1 Reaction tower
2 Heat exchanger
3 Waste water supplying pump
4 Compressor
5 Gas-liquid separator
6 Liquid surface control valve
7 Pressure control valve
8 Bypass regulating valve
9 Cooler
10 Waste water supplying line
11 Oxygen-containing gas supplying line
12 Treated liquid line
13 Gas discharging line
14 Treated liquid discharging line
15 Ozone generator
16 Gas flow rate regulating valve
17 Pressure layer having a deformation following-up ability (upper packed bed)
18 Solid catalyst packed bed
19 Grid
20 Partition
21 Boundary area
22 Nozzle
23 Layer for dispersing and mitigating upward stream of waste water (lower packed bed)
24 Perforated plate

BEST MODE FOR CARRYING OUT THE INVENTION

First of all, a history of attaining the apparatus of the present invention will be described.

The present inventors have conducted studies to find out a pressure member capable of following up the sinking of a solid catalyst packed bed, instead of a conventional fixed pressure member, in order to prevent the abrasion of the solid catalyst due to its movements, thereby solving the problems of deterioration of performance of the solid catalyst and an increase in pressure loss. As a result of studies, they have found that it is effective to provide a water-permeable pressure layer on the solid catalyst packed bed. The water-permeable pressure layer has an ability of following-up the movement of the solid catalyst packed bed, and therefore, sinks in accordance with the sinking of top surface of the solid catalyst packed bed. By use of the water-permeable pressure layer, the above-described problems can be solved. The water-permeable pressure layer is especially effective when the apparatus has a reaction tower having an inner diameter of about 100 mm or smaller, and 300 mm or smaller at the maximum.

When the apparatus has a reaction tower having larger diameter, specifically, 100 mm or larger, 300 mm or larger, and still 600 mm or larger, it is difficult to attain sufficient effect even though using of the water-permeable pressure layer described above due to the following reason. When the apparatus has a reaction tower having large inner diameter, the solid catalyst does not sink in parallel to the contact surface with the water-permeable pressure layer (i.e. does not sink uniformly), but sinks nonuniformly. At the portion where the solid catalyst sinks deeply, a space is created between the top surface of the solid catalyst packed bed and the water-permeable pressure layer, and the above-described problems are likely to occur.

The present inventors have conducted further studies, and have found that the above-described problems can be solved by providing a member capable of successfully following up the deformation, such as sinking, of the top surface of the solid catalyst packed bed. Through the use of such a member, substantially no space is created between the top surface of the solid catalyst packed bed and the member, thereby solving the above-described problems.

When the apparatus has a reaction tower having a very large inner diameter, specifically, 350 mm or larger, and still 510 mm or larger, it is very effective to provide a partition for dividing the boundary area between the upper part of the solid catalyst packed bed and the water-permeable pressure layer into a plurality of segments in a vertical direction. In addition, as to the abrasion of the solid catalyst caused by the waste water introduced from the bottom of the reaction tower, the present inventors have found it very effective to provide a layer capable of dispersing and mitigating the upward stream of the waste water under the solid catalyst packed bed. As a result, the present invention has been attained.

As described above, the waste water treatment apparatus of the present invention basically has a structure in which a water-permeable pressure layer is provided on the solid catalyst packed bed. The water-permeable pressure layer has an ability of following up the deformation or the movement of the top surface of the solid catalyst packed layer. The present invention includes the first to seventh embodiments which will be described later. Hereinafter, each apparatus of the respective first to seventh embodiments will be described.

First, the first embodiment of the apparatus of the present invention (the first configuration) will be described. As described above, the first configuration has a structure in which the water-permeable pressure layer having an ability of the deformation of the packed bed of the solid catalyst and/or the solid adsorbent is provided on the solid catalyst and/or the solid adsorbent packed bed. The use of the pressure layer is especially effective when the reaction tower has a large inner diameter, specifically, about 100 mm or larger.

The "water-permeable pressure layer having an ability of following up the deformation" (hereinafter, referred to as "the upper deformation packed bed" again.) has a load enough to substantially prevent the movement of the solid catalyst and/or the solid adsorbent (hereinafter, referred to as "a solid catalyst" again.) in the packed bed, and satisfactorily follows up the deformation of the solid catalyst packed bed, and also has a water-permeability. The upper deformation packed bed follows up the deformation such as sinking of the top surface of the solid catalyst packed bed, and therefore, prevents a space in which the solid catalyst and/or the solid adsorbent moves from being created between the top surface of the solid catalyst packed bed and the upper deformation packed bed. The movement includes travelling, swinging, and the like which cause an undesirable abrasion of the solid catalyst and/or solid adsorbent.

The upper deformation packed bed is necessarily required to allow waste water to pass therethrough, because it is used in the waste water treatment apparatus. In this context, the upper deformation packed bed is required to be "water-permeable".

The upper deformation packed bed used in the present invention is not specifically limited, as far as it has enough load, and has a deformation following-up ability as well as a water-permeability. Especially preferable is a packed bed constituted by granular substance. Alternatively, a packed bed constituted by substance in the form of a connected body such as fibers, chains, beads, and the like also may be used.

Hereinafter, the upper deformation packed bed will be described in detail taking a packed bed constituted by granular substance as an example.

(a) Shape

The packed bed may be constituted by any granular substance as far as it attains an ability of following up the deformation of the top surface of the solid catalyst packed bed. Especially preferable is a substance which, in the reaction tower, is capable of sinking in the form of bridge in accordance with the sinking of the solid catalyst packed bed, thereby creating no space between the top surface of the solid catalyst packed bed and the upper deformation packed bed. Typical examples of the shape of the granular substance include sphere, pellet, agglomerate, ring, saddle, and polygon. Among them, preferable shape are sphere and pellet. When the granular substance has a sphere shape, there is no need that it is a complete sphere, but is enough to be substantially sphere.

(b) Particle Diameter

The particle diameter of the granular substance is determined in accordance with the particle diameter of the solid catalyst, and therefore, cannot be specifically limited. It is recommended, however, that the particle diameter of the granular substance is determined so that the ratio between the particle diameter of the granular substance and the particle diameter of the solid catalyst (an average particle diameter of the granular substance/an average particle diameter of the solid catalyst) is preferably in the range between 5/1 to 1/3, and more preferably 3/1 to 1/2, the most preferably 2/1 to 2/3. If the granular substance has too large particle diameter with respect to the solid catalyst, the upper deformation packed bed partially does not give enough pressure to the solid catalyst. That is, a space which causes the movement of the solid catalyst tends to be easily created, and therefore, it is not preferable. Contrary to this, if the granular substance has too small particle diameter, it enters between the solid catalyst particles, and therefore, it is not preferable.

In the present invention, "an average particle diameter" of the granular substance, the solid catalyst and solid adsorbent is obtained by averaging particle diameters of samples, and "a particle diameter" means the maximum particle diameter of the samples. For example, in the case where the granular substance has a sphere shape, the particle diameter means its diameter. In the case where the granular substance has a pellet shape, the particle diameter means its length along a diagonal direction.

Specifically, in the case where the granular substance has a sphere shape or a pellet shape, its average particle diameter is usually 3 to 30 mm. Preferably, its average particle diameter is in the range of 4 mm to 20 mm, and more preferably 5 mm to 15 mm.

(c) Packing Amount

The amount of the granular substance packed into the reaction tower is not specifically limited as far as it gives a sufficient pressure to the solid catalyst, and may be determined taking the specific gravity of the granular substance into consideration. If the amount thereof is too large, high cost is required. Contrary to this, if the amount thereof is too small, sufficient pressure cannot given to the solid catalyst.

Instead of the granular shape, the substance also may be in the form a connected body such as fibers, chains, beads and the like.

Specifically, the granular substance is packed to a height of 30 to 1000 mm. Preferably, it is packed to a height of 50 mm or larger, and more preferably 80 mm or larger, and the most preferably 150 mm or larger. The preferable upper limit thereof is 600 mm, and more preferable 400 mm.

(d) Specific Gravity

The specific gravity of the granular substance is not specifically limited, and may be properly determined. In general, however, the specific gravity thereof is 2.5 or larger, and preferably in the range between 4 to 12. If the specific gravity is too small, sufficient pressure cannot be given to the solid catalyst packed bed. In this case, in order to give sufficient pressure to the solid catalyst, it is necessary to increase the amount of the granular substance, which creates a problem of high cost and the like. In addition, a small specific gravity has another problem in that, when waste water and air are introduced at a high flow rate from the bottom of the solid catalyst packed bed, the granular substance tends to move easily and is abraded. In this description, the specific gravity means true specific gravity, and is not bulk density, fill density, and apparent specific gravity which are generally used.

In the present invention, preferably used is a granular substance having only little amount of minute pores. If the granular substance has large amount of minute pores and has small apparent specific gravity, it cannot give a sufficient pressure to the solid catalyst. In the present invention, preferably used is the granular substance having the true specific gravity and the apparent specific gravity (obtained from the outer volume and the mass of the granular substance) substantially equal to each other.

(e) Kind of Material

The material of the granular substance is not specifically limited, and generally is metal or ceramics. Specific examples thereof include iron, copper, stainless, Hastelloy (trademark), Inconel (trademark), titanium, zirconium, titania, zirconia, alumina, silicon nitride, carbon nitride, glass, and the like. In the case of wet-oxidation method, preferable examples used as the granular substance are stainless (SUS), Hastelloy (trademark), Inconel (trademark), titanium, and zirconium, and among them, stainless is especially preferable.

(f) Void Percentage

The void percentage of the granular substance in the packed bed is not specifically limited. The recommended void percentage is usually 20 to 70 volume percent (a volume standard of the entire packed bed), and more preferably 30 to 60 volume percent, and the most preferably 35 to 50 volume percent. If the void percentage is too small, the distance between adjacent granular substances becomes too small. As a result, waste water does not flow smoothly, and pressure loss is generated in this packed bed. Contrary to this, if the void percentage is too large, the upper deformation packed bed cannot give sufficient pressure to the solid catalyst packed bed. In addition, when large amount of waste water is supplied, the abrasion of the solid catalyst is large.

There is no need that the granular substance has an identical shape, particle diameter, specific gravity and material over the entire packed bed, but a plural kinds of substances may be used together as far as they are optimum for having ability of giving sufficient pressure and a deformation following-up ability. For example, the granular substance packed bed may have two-layered structure including an upper layer and a lower layer. The lower layer of the upper packed bed, which is brought into contact with the top surface of the solid catalyst packed bed, is mainly constituted by granular substance having a shape and particle size preferable for attaining the ability of following up the deformation. The upper layer of the upper packed bed is mainly constituted by granular substance having specific gravity, shape, and particle size preferable for giving sufficient pressure to the solid catalyst.

Figure 8:
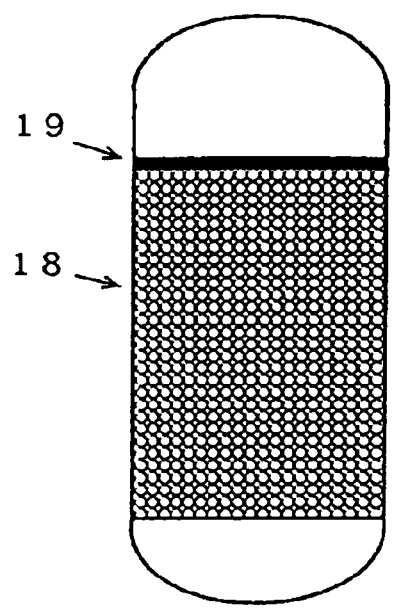
FIG. 8 is a diagram illustrating the relationship between a solid catalyst packed bed and a grid soon after the initiation of the waste water treatment in a conventional water treatment apparatus.
Figure 9:
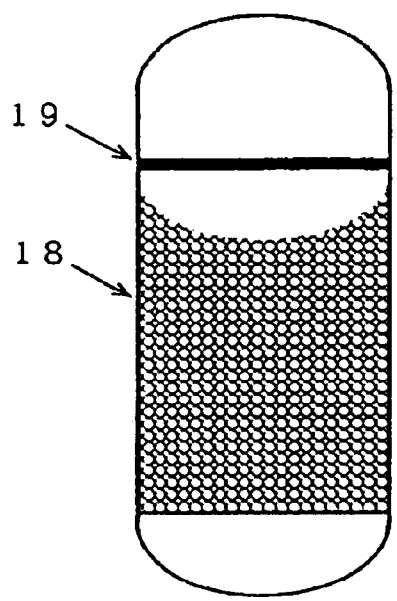
FIG. 9 is a diagram illustrating the relationship between a solid catalyst packed bed and a grid after long time has elapsed since the initiation of the waste water treatment in a conventional waste water treatment apparatus.

Next, the performance of the upper deformation packed bed will be described referring to FIGS. 6 to 9. FIGS. 8 and 9 show conventional examples. Specifically, FIGS. 8 and 9 are diagrams illustrating the relationship between the solid catalyst packed bed and a grid in the case where a grid is used as a fixed pressure member for preventing the movement of the solid catalyst. FIG. 8 shows a state soon after the initiation of waste water treatment, and FIG. 9 shows a state after long time has elapsed since the initiation of waste water treatment.

As shown in FIG. 8, at the initial stage of the waste water treatment, the movement of the solid catalyst is sufficiently suppressed by the grid. However, with the elapse of time, the solid catalyst is tightly compacted in the packed bed and the top surface thereof starts to sink downward, especially at its center area. The grid cannot follow up the sinking of the solid catalyst packed bed, and as a result, a space is inevitably created between the grid and the top surface of the solid catalyst packed bed. Due to the space, the solid catalyst vigorously moves to abrade, and finally, assumes the state shown in FIG. 9.

Figure 6:
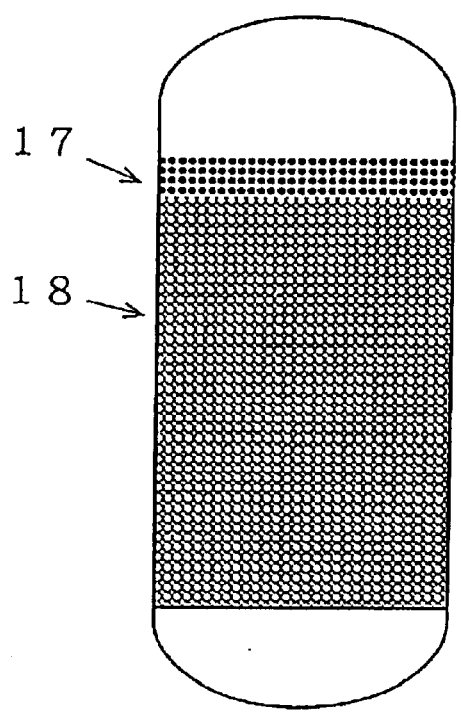
FIG. 6 is a diagram illustrating the relationship between a solid catalyst packed bed and a water-permeable packed bed having an ability of following up the deformation of the solid catalyst packed bed soon after the initiation of the waste water treatment in the apparatus of the first configuration of the present invention.
Figure 7:
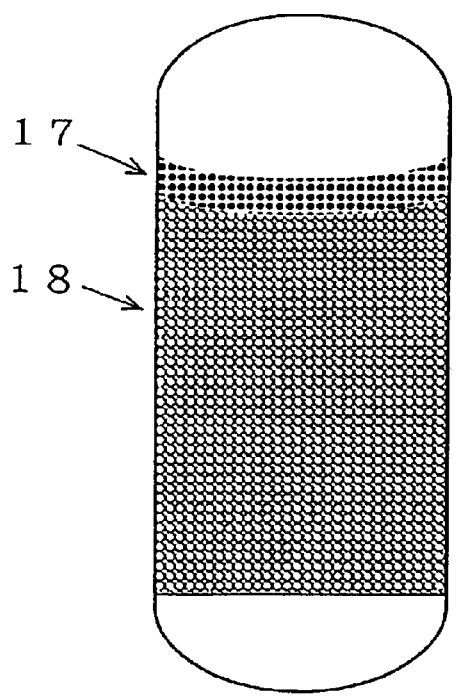
FIG. 7 is a diagram illustrating the relationship between a solid catalyst packed bed and a water-permeable pressure layer having an ability of following up the deformation of the solid catalyst packed bed after long time has elapsed since the initiation of the waste water treatment in the apparatus of the first configuration of the present invention.

Contrary to this, FIGS. 6 and 7 are diagrams illustrating the relationship between the solid catalyst packed bed and the upper packed bed in the apparatus according to the present invention. FIG. 6 shows a state soon after the initiation of waste water treatment and FIG. 7 shows a state after a long time has elapsed since the initiation of the treatment.

In the present invention, the upper deformation packed bed has an ability of sufficiently following up the deformation such as sinking of the top surface of the solid catalyst packed bed. Therefore, no space is substantially created between the top surface of the solid catalyst packed bed and the upper deformation packed bed. The solid catalyst is kept in a good state even after a long time has elapsed since the initiation of the treatment. The movement of the solid catalyst in the packed bed is efficiently prevented, thereby solving the problem of the deterioration of its performance due to the abrasion thereof, an increase in pressure loss and the like.

As described above, even if the top surface of the solid catalyst packed bed nonuniformly sinks, the upper deformation packed bed follows up the sinking of the top surface of the solid catalyst packed bed. By use of the upper deformation packed bed, the creation of undesirable space between the top surface of the solid catalyst packed bed and the upper packed bed can be substantially prevented.

It is recommended to provide a conventional fixed pressure member on the upper deformation packed bed, in order to prevent the upper deformation packed layer and the solid catalyst from flowing out of the reaction tower when any trouble occurs during operation. In this case, the conventional fixed pressure member is not specifically limited, and may be selected from the pressure members generally used in waste water treatment (for example, a wire netting, a single-hole or perforated plate, a grid, and the like). It is recommended to provide a wire netting and a grid on the upper deformation packed bed.

A water-permeable soft sheet may be interposed between the solid catalyst packed bed and the upper deformation packed bed. The water-permeable soft sheet is a sheet which efficiently prevents these packed beds from mixing with each other, and also promotes the effect of the upper packed bed. For example, a nonwoven cloth is used as the soft sheet. Instead of nonwoven cloth, the soft sheet obtained by weaving chains in the form of cloth may be used.

As described above, the first configuration of the apparatus of the present invention has a single structure in which the solid catalyst is packed in the reaction tower to form a solid catalyst packed bed, and the upper deformation packed bed is provided on the solid catalyst packed bed. The first configuration also may have a multiple structure including a plurality of devises respectively including the reaction tower packed with the solid catalyst packed bed and the upper deformation packed bed.

Alternatively, the first configuration may be constructed so that the reaction tower includes a single or a plurality of combinations of a vessel packed with the solid catalyst and the other vessel packed with the upper deformation packed bed on the solid catalyst packed bed.

Next, the second embodiment of the present invention (the second configuration) will be described. In the second configuration, an upper deformation packed bed is provided on a packed bed of the solid catalyst and/or the solid adsorbents, in addition, the upper part of the solid catalyst packed bed and the upper deformation packed bed are divided into a plurality of segments by a partition having walls extending in a vertical direction.

The second apparatus is especially effective in the case where the reaction tower has a very large inner diameter (specifically, about 350 mm or larger, and still 510 mm or larger). When the inner diameter of the reaction tower is very large (i.e. the solid catalyst packed bed has a very large cross-sectional area in a horizontal direction), it is necessary to increase the packing amount and height of the upper deformation packed bed. The larger the cross-sectional area of the solid catalyst packed bed becomes, the more deeply and nonuniformly the solid catalyst packed bed sinks. As the solid catalyst packed bed sinks, the upper deformation packed bed tends to travel in a horizontal (lateral) direction as well as in a vertical direction. In order to give sufficient pressure over the entire solid catalyst packed bed and to successfully follow up the traveling in a lateral direction, a large packing amount of the upper deformation packed bed is required. In this case, it is very effective to provide a partition for dividing the upper part of the solid catalyst packed bed and the upper deformation packed bed into segments in a vertical direction (hereinafter, this partition is simply referred to as "a partition" or "a vertical partition" in some cases.).

Figure 18:
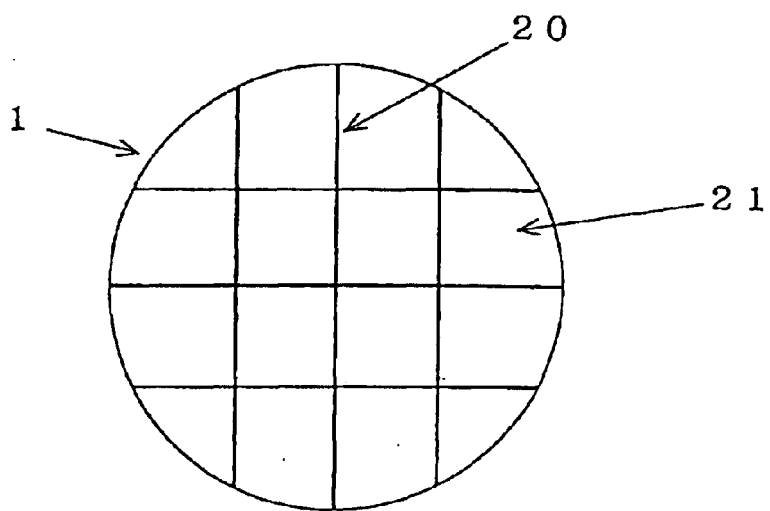
FIG. 18 is a lateral cross-sectional view schematically showing segments formed by dividing the boundary area between the upper area of the solid catalyst packed bed and the upper packed bed by the partition.
Figure 19:
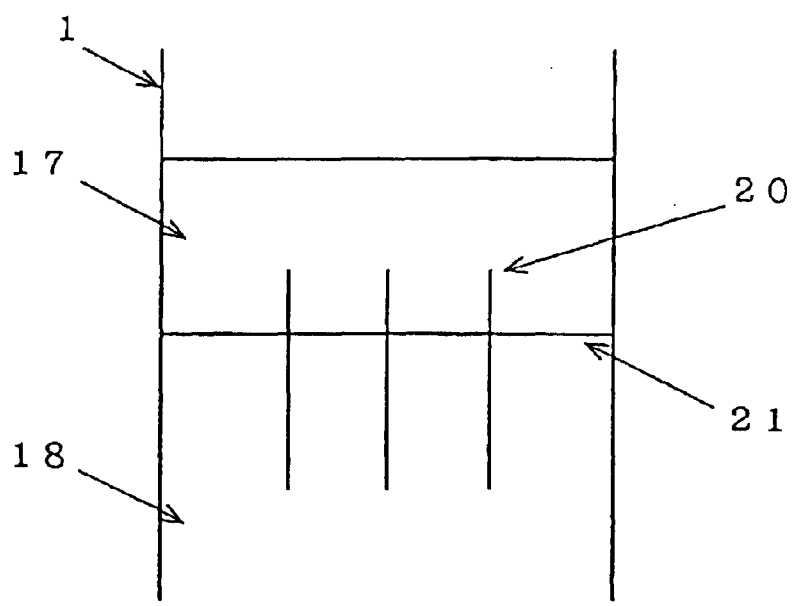
FIG. 19 is a longitudinal cross-sectional view schematically showing segments formed by dividing the boundary area between the upper area of the solid catalyst packed bed and the upper packed bed by the partition.

In the present invention, the partition divides the upper part of the solid catalyst packed bed and the upper deformation packed bed into segments in a vertical direction. Specifically, as shown in FIGS. 18 and 19, the partition divides the boundary area between the solid catalyst packed bed and the upper deformation packed bed into two or more segments. The partition is not specifically limited as far as it allows the upper deformation ability to keep its pressure-giving ability and deformation following ability.

(a) Shape

Figure 16:
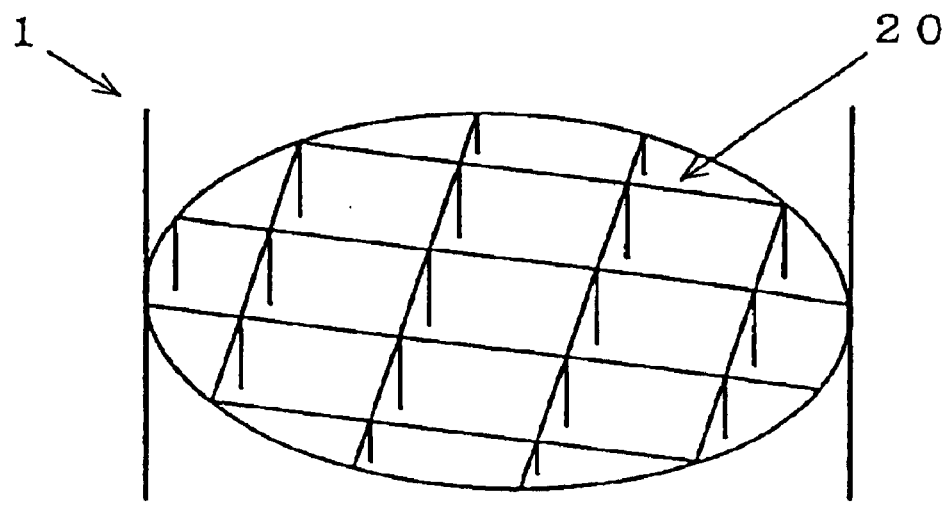
FIG. 16 is a schematic diagram showing an embodiment of partition in the apparatus of the second configuration of the present invention.

The shape of the partition is not specifically limited as far as they it divides the upper part of the solid catalyst packed bed and the upper deformation packed bed in a substantially vertical direction. The partition may be constituted by plate or wire netting, which may be in various shapes such as a cylinder of which inner space is divided in the form of dice, or alternatively a plurality of such partitions may be combined into one piece. Preferably, the partition is constituted by plate which has segments in the form of dice as shown in FIG. 16. With the shape as shown in FIG. 16, the present invention can be easily conducted not impairing the pressure-giving ability and the deformation following-up ability of the water-permeable pressure layer. In the second configuration, the expression "in a vertical direction" used in the description "the partition dividing the upper part of the solid catalyst packed bed and the upper deformation packed bed in a vertical direction" never means that the partition has walls extending in a precisely vertical direction, but some deviation may be allowed as far as it does not impair the pressure-giving ability and the permeability of the water-permeable pressure layer.

(b) Cross-Sectional Area

The cross-sectional area in a horizontal direction of the respective segments formed by the partition is properly determined in accordance with the cross-sectional area in a horizontal direction of the solid catalyst packed bed to which the partition is provided (usually, a cross-sectional area of the reaction tower). Hereinafter, a preferable cross-sectional area in a horizontal direction of the respective segments will be described, making a comparison with the cross-sectional area of the reaction tower.

As described above, the partition is very effective when the reaction tower has a very large cross-sectional area, specifically, 1000 $cm^2$ or large (a shape of a circle with a diameter of about 35 cm), and more effective in the case of the reaction tower having a cross-sectional area of 2000 $cm^2$ or larger (a shape of a circle with a diameter of about 51 cm), and most effective in the case of the reaction tower having a cross-section area of 4000 $cm^2$ or larger (a shape of a circle with a diameter of about 72 cm). If the cross-sectional area of the reaction tower is less than 1000 $cm^2$, there is no need to provide the partition, and the upper deformation packed bed alone has sufficient effect. There is no upper limit of the cross-sectional area of the reaction tower. As larger the cross-sectional area of the reaction tower becomes, the more effective the partition becomes. Usually, however, it is recommended to use a reaction tower having a cross-sectional area of 100 $m^2$ or smaller.

The cross-sectional area in a horizontal direction of the respective segments (hereinafter, simply referred to as "a cross-sectional area of the segment" in some cases) is properly determined in accordance with the cross-sectional area of the reaction tower which is actually used. Specifically, the cross-sectional area of the segment is determined in accordance with the cross-sectional area of the reaction tower (in a range of about 1000 $cm^2$ to 100 $m^2$) in such a manner that the effect of the partition can be sufficiently obtained.

Specifically, when the cross-sectional area of the reaction tower is less than 2000 $cm^2$, the cross-sectional area of the segment is preferably 50 $cm^2$ to less than 1000 $cm^2$, and more preferably 200 $cm^2$ to less than 500 $cm^2$. When the cross-sectional area of the reaction tower is 2000 $cm^2$ to less than 4000 $cm^2$, the cross-sectional area of the segment is preferably 200 $cm^2$ to less than 2000 $cm^2$, and more preferably 300 $cm^2$ to less than 1000 $cm^2$. When the cross-sectional area of the reaction tower is 4000 $cm^2$ to less than 8000 $cm^2$ (a shape of a circle with a diameter of less than about 1 m), the cross-sectional area of the segment is preferably 200 $cm^2$ to less than 2000 $cm^2$, and more preferably 300 $cm^2$ to 1500 $cm^2$. When the cross-sectional area of the reaction tower is 8000 $cm^2$ or larger (a shape of a circle with a diameter of larger than about 1 m), the cross-sectional area of the segment is preferably 300 $cm^2$ to less than 2500 $cm^2$, and more preferably 400 $cm^2$ to less than 1500 $cm^2$.

When the cross-sectional area of the segment is less than 50 cm$^2$, the upper deformation packed bed alone has sufficient effect without providing the partition; the partition may be provided, though. If the partition is provided in this case, the upper deformation packed bed has no need to be in a large volume, and therefore, it is effective to form the partition with having a long distance from each other. Contrary to this, if the cross-sectional area of the segment is larger than 2500 cm$^2$, no sufficient effect can be obtained even if the partition is provided. The partition is very effective when the reaction tower has a cross-sectional area of 2000 cm$^2$ or larger (preferably 4000 cm$^2$ or larger). Taking this into consideration, the generally recommended cross-sectional area of the segment is preferably 200 cm$^2$ to less than 2000 cm$^2$, and more preferably 300 to less than 1500 cm$^2$.

The shape of the segments is not specifically limited; however, it is preferable that each segment has the lateral and longitudinal lengths substantially equal to each other. There is no need that the segments formed by the partition has the same cross-sectional area as each other. It is preferable that the segments at the vicinity of the center area in the packed bed has a cross-sectional area smaller than those at a periphery thereof. This structure is very effective in many cases, because in general, the solid catalyst packed bed sinks deeply at its center area than its peripheral area.

In the above description, the cross-sectional area of the segment means the cross-sectional area of the largest segment among the segments formed by the partition.

(c) Height

The height in a vertical direction of the partition is not specifically limited. It is effective, however, that the partition extends downward beyond the bottom surface of the upper deformation packed bed. That is, the partition preferably divides the boundary area between the upper part of the solid catalyst packed bed and the upper packed bed (hereinafter, simply referred to as "a boundary area" in some cases). The upper part of the packed bed may or may not be divided by the partition. The boundary area sinks with the elapse of time during the treatment, and therefore, the partition preferably extends downward deeply. Specifically, the height in the vertical direction of the partition may be properly determined in the range of 20 cm to 300 cm. Preferably, the height is 30 cm to 200 cm, and more preferably 50 cm to 100 cm. The partition of the height less than 20 cm is too short to divide the boundary area when the boundary area sinks with the elapse of time in many cases. Contrary to this, if the partition has a height larger than 300 cm, its effect is saturated.

(d) Material

The material of the partition is not specifically limited, and metal is usually used as a material of the partition. Specific examples thereof include, iron, copper, stainless, Hastelloy (trademark), Inconel (trademark), titanium, zirconium and the like. In the wet-oxidation method, preferably used is a partition constituted by stainless, Hastelloy (trademark), Inconel (trademark), titanium, zirconium and the like. Among them, the partition constituted by stainless is especially preferable. Depending on the conditions of waste water treatment, a partition constituted by glass or resin may be used.

Next, the operation of the partition will be described referring to FIGS. 10 and 11.

Figure 10:
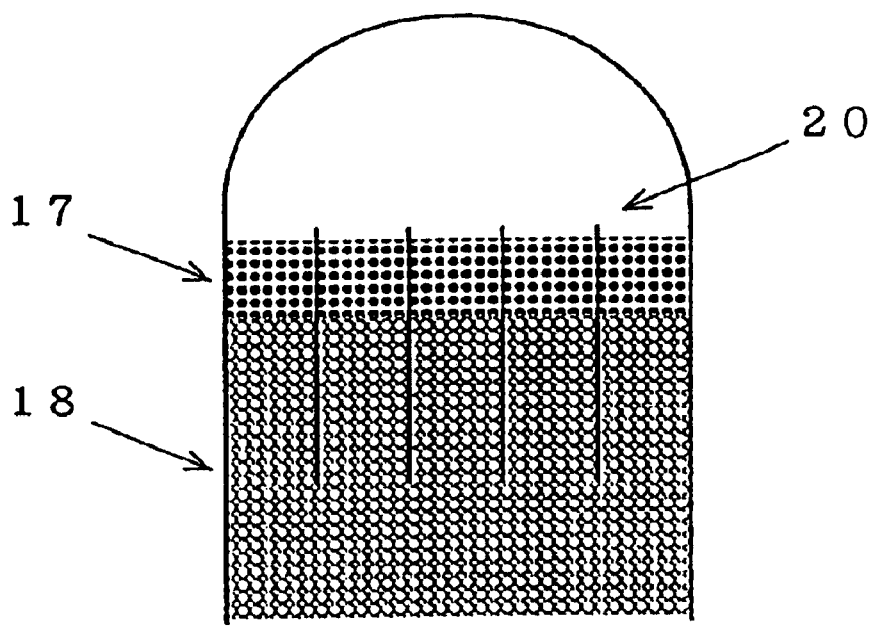
FIG. 10 is a diagram showing the relationship between a solid catalyst packed bed, a water-permeable pressure layer having an ability of following up the deformation of the solid catalyst packed bed, and a partition soon after the initiation of the waste water treatment in the apparatus of the second configuration of the present invention.
Figure 11:
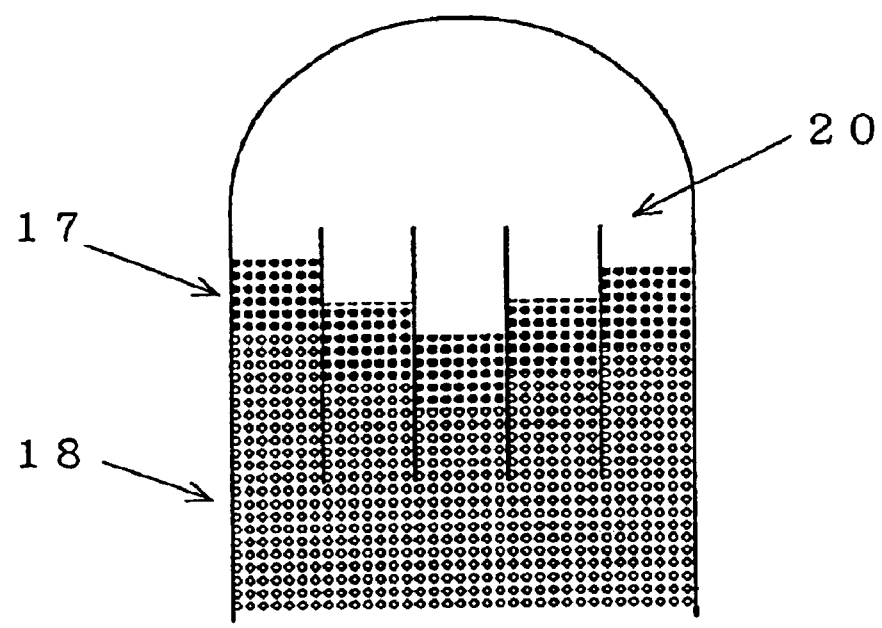
FIG. 11 is a diagram illustrating the relationship between a solid catalyst packed bed, a water-permeable pressure layer having an ability of following up the deformation of the solid catalyst packed bed, and a partition after long time has elapsed since the initiation of waste water treatment in the apparatus of the second configuration of the present invention.

FIGS. 10 and 11 are diagrams showing the positional relationship between the solid catalyst packed bed, the upper deformation packed bed, and the partition in the apparatus of the second configuration of the present invention. FIG. 10 shows a state soon after the initiation of the waste water treatment. FIG. 11 shows a state after long time has elapsed since the initiation of the waste water treatment.

In the apparatus of the second configuration, the partition divides the boundary area between the solid catalyst packed bed and the upper deformation packed bed. In the respective segments formed by the partition, the upper deformation packed bed follows up and deforms in accordance with the deformation of the solid catalyst packed bed. The moving distance of the upper deformation packed bed varies by each segment, and there are some segments where the upper deformation packed bed sinks deeply. According to the present invention, the partition divides the upper deformation packed bed into a plurality of segments having a small cross-sectional area in a horizontal direction, and therefore, nonuniform sinking thereof can be suppressed. The sinking of the upper deformation packed bed is relatively uniform as a whole. Furthermore, since the upper deformation packed bed is divided into the segments by the partition, there is no fear that the upper deformation packed bed travels in a lateral direction beyond the position defined by the partition. By use of the partition, even if the solid catalyst packed bed sinks nonuniformly, the upper deformation packed bed can continuously give sufficient pressure over the entire solid catalyst packed bed. Even if the upper deformation packed bed is in a small volume, no space is substantially created between the top surface of the solid catalyst packed bed and the upper deformation packed bed. With this arrangement, the state shown in FIG. 11 can be retained after a long time has elapsed after the initiation of the treatment.

The apparatus of the second configuration of the present invention usually has a single structure in which the solid catalyst packed bed is packed into the reaction tower and a water-permeable pressure layer having a deformation following-up ability is provided on the solid catalyst packed bed, and the partition is provided at the boundary area therebetween. The apparatus may have a multiple structure including a plurality of the devices respectively having the above-described configuration.

It is also possible that, the solid catalyst is charged into a specific vessel to form a solid catalyst packed bed, and a water-permeable pressure layer having a deformation following-up ability is provided on the solid catalyst packed bed, and the partition is provided therebetween. The vessel having a single or plurality of these structures is accommodated into the reaction tower.

According to the third embodiment of the apparatus of the present invention (the third configuration), "a layer for dispersing and mitigating the upward stream of waste water" (hereinafter, referred to as "a lower packed bed" again) is provided under the packed bed of the solid catalyst and/or solid adsorbent. The lower packed bed disperses the upward stream of waste water blown off from a nozzle, or a hole of a single-hole or perforated plate so as to prevent the waste water from strongly colliding with the solid catalyst packed bed. With this arrangement, the waste water is supplied to the solid catalyst packed bed as an uniform flow at low linear velocity. The lower packed bed is required, therefore, to have sufficiently high abrasion resistance, corrosion resistance, and strength so as to be resistive to the direct collision with the waste water blown off from the nozzle or the hole of the single-hole or perforated plate. The lower packed bed is also required to have sufficiently high strength so as to sustain the load of the solid catalyst packed bed, because the solid catalyst packed bed is provided on the lower packed bed. Hereinafter, a preferable example of the lower packed bed will be described in detail.

(a) Material

In order to satisfy the requirements described above (the high abrasion resistance, corrosion resistance, and strength), the lower packed bed is preferably constituted by metallic or ceramics substance. Typically used is a substance constituted by iron, copper, stainless, Hastelloy (trademark), Inconel (trademark), titanium, zirconium, titania, zirconia, alumina, silicon nitride, carbon nitride, glass, and the like.

Among them, especially preferable for use in the wet-oxidation method is a lower packed bed constituted by a substance constituted by stainless, Hastelloy (trademark), Inconel (trademark), titanium, and zirconium, and the most preferable is stainless.

(b) Packing Amount

The amount of the substance is properly determined so that the packed bed constituted by the substance effectively disperses the upward stream of waste water to prevent it from directly colliding with the solid catalyst packed bed. Specifically, the substance is preferably packed to the height of 10 mm to 300 mm, and more preferably 30 mm to 250 mm, and the most preferably 40 mm to 200 mm to form a packed bed. If the packing amount is too small, no desirable effect can be obtained by the lower packed bed. Contrary to this, if the packing amount is too large, high cost is incurred and this is not economical.

(c) Shape

As described above, the lower packed bed is required to sufficiently disperse the waste water so that the waste water is uniformly supplied to the solid catalyst packed bed without drifting. Therefore, the substance constituting the lower packed bed is required to have such a shape as to sufficiently disperse the waste water, and also to have high abrasion resistance and strength. As far as these requirements are satisfied, there is no limitation on the shape of the substance. Typical examples of the shape include sphere, pellet, agglomerate, ring, saddle, polygon, and the like. In addition, the substance may have a shape of connected body such as fiber, chain, beads, and the like.

Among them, the shape of sphere, pellet, ring, and saddle is preferable, and more preferable is a shape of sphere, pellet, and ring. The substance of the shape described above is also recommendable from the viewpoint that the granular substance can be easily packed into the reaction tower.

The substance is a metallic or ceramics substance which is conventionally used in an absorption tower and a distillation tower in a gas-liquid contact apparatus, such as raschig ring, slotted ring, raschig ring, dixon packing, heri pack, McMahon saddle, herix, canon packing, pall ring, coil packing, berl saddle, intalox saddle, bar saddle, goodloe packing, demister, and the like.

(d) Size

The size of the substance constituting the lower packed bed is not specifically limited as far as the above-described requirements are satisfied. For example, in the case of granular substance, its average particle diameter is usually 3 mm to 30 mm, and preferably 4 mm to 20 mm, and more preferably 5 mm to 15 mm. If the average particle diameter is too large or too small, the substance enters between the solid catalyst particles, and no desirable effect can be obtained.

There is no limitation on the ratio between the average particle diameter of the substance constituting the lower packed bed and the average particle diameter of the solid catalyst. In the case of granular substance constituted by metal or ceramics, this ratio (the average particle diameter of the granular substance constituted by metal or ceramics/the average particle diameter of the solid catalyst component) is preferably 5/1 to 1/5, and more preferably 3/1 to 1/3, and the most preferably 2/1 to 1/2. With the ratio lager than 5/1, the metal or ceramics substance has a size far larger than solid catalyst. In this case, the solid catalyst particles enter between the particles of the metal or ceramics substances. Contrary to this, with the ratio smaller than 1/5, the metal or ceramics substance has a size far smaller than the solid catalyst. In this case, the metal or ceramics substance enter between the particles of the solid catalyst. In both cases, no desirable effect of preventing the solid catalyst from being abraded is obtained.

In the present invention, "the average particle diameter" is obtained by averaging the particle diameters of samples, and "the particle diameter" means the maximum diameter among them. For example, in the case where the granular substance has a sphere shape, the particle diameter means its diameter. In the case where the granular substance has a pellet shape, the particle diameter means its length along a diagonal direction.

(e) Void Percentage

The void percentage of the lower packed bed is not specifically limited, and usually is 20 to 99 volume percent (a volume standard of the entire lower packed layer), and more preferably 30 to 97 volume percent, and the most preferably 35 to 93 volume percent. If the void percentage is too small, the distance between adjacent granular substances becomes too small. As a result, waste water does not flow smoothly, and pressure loss increases in this packed bed. Contrary to this, if the void percentage is too large, the abrasion of solid catalyst cannot be sufficiently prevented.

There is no need that the granular substance has an identical shape, particle diameter, specific gravity and material over the entire lower packed bed, but various kinds of granular substances may be used together as far as the above-described effects are attained. In this case, substances suitable for the usage and the use conditions are properly selected.

The substance may be directly charged into the reaction tower to form the lower packed bed. In usual, however, a support member constituted by wire netting, single-hole or perforated plate, grid, or the combination thereof is mounted in the lower portion of the reaction tower, and then, the substances are provided on the support member.

Figure 12:
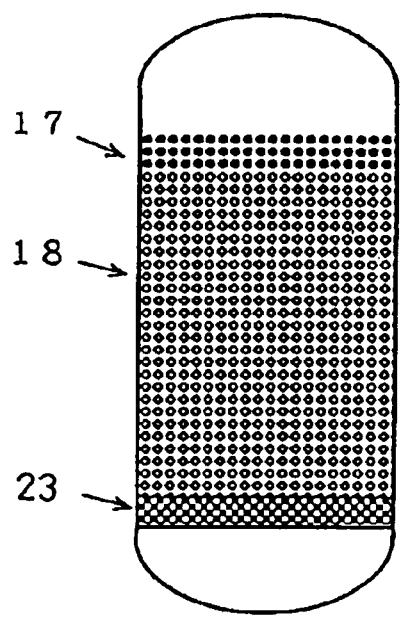
FIG. 12 is a diagram illustrating the relationship between a solid catalyst packed bed, a layer for dispersing and mitigating the upward stream of waste water, and a water-permeable pressure layer having an ability of following up the deformation of the solid catalyst packed bed soon after the initiation of waste water treatment in the apparatus of the fourth configuration of the present invention.
Figure 13:
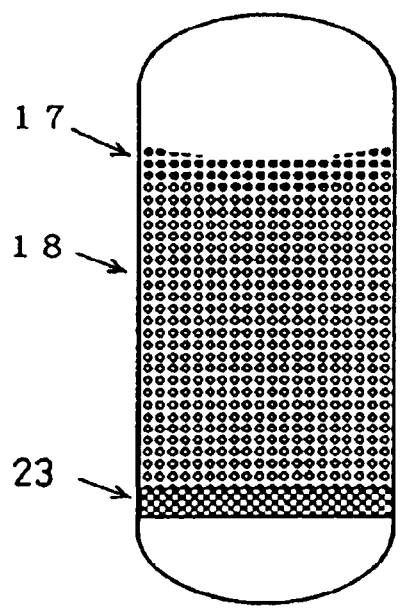
FIG. 13 is a diagram illustrating the relationship between a solid catalyst packed bed, a layer for dispersing and mitigating the upward stream of waste water, and a water-permeable pressure layer having an ability of following up the deformation of the solid catalyst packed bed after long time has elapsed since the initiation of the waste water treatment in the apparatus of the fourth configuration of the present invention.

Next, the performance of the lower packed bed will be described referring to FIGS. 12 to 15. FIGS. 12 and 13 are diagrams showing the fourth configuration of the apparatus of the present invention (the configuration in which the lower packed bed is provided under the solid catalyst packed bed, and the upper deformation packed bed is provided on the solid catalyst packed bed). The third apparatus coincides with the fourth apparatus in that the lower packed bed is provided under the solid catalyst packed bed. Hereinafter, the third apparatus will be described referring to the fourth apparatus for convenience.

Figure 14:
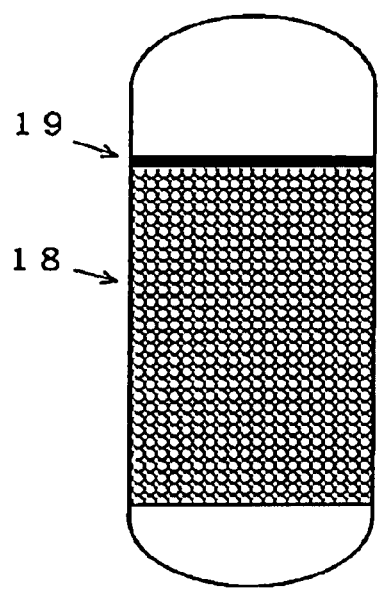
FIG. 14 is a diagram illustrating the relationship between a solid catalyst packed bed and a grid soon after the initiation of waste water treatment in a conventional waste water treatment apparatus.
Figure 15:
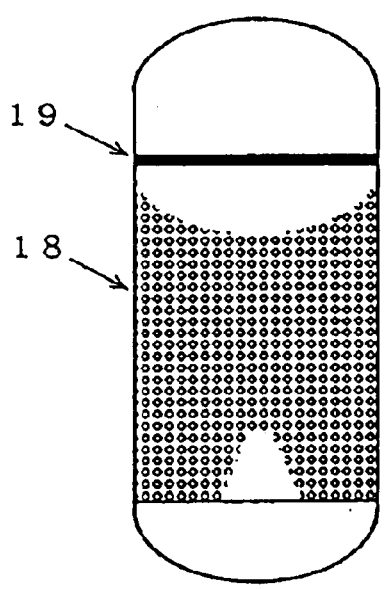
FIG. 15 is a diagram illustrating the relationship between a solid catalyst packed bed and a grid in a conventional waste water treatment apparatus.

FIGS. 14 and 15 are diagrams respectively showing an inside state of a conventional apparatus for treating waste water. Unlike the apparatus of the present invention, in the conventional apparatus, no lower packed bed is provided in the reaction tower, and the solid catalyst is directly provided on the wire netting mounted in the lower part of the reaction tower. On the solid catalyst packed bed, a grid is provided as a fixed pressure member. FIG. 14 shows a state soon after the initiation of waste water treatment. FIG. 15 shows a state after long time has elapsed since the initiation of waste water treatment.

As shown in FIG. 14, at the initial stage of the waste water treatment, the reaction tower is tightly packed with the solid catalyst with no space. The movement of the solid catalyst is sufficiently suppressed by the grid. However, the waste water strongly collides with the bottom surface of the solid catalyst packed bed, and with the elapse of time, the lower part of the solid catalyst packed bed is abraded by the waste water and a space is created. Furthermore, the solid catalyst is tightly compacted, and the top surface, especially at the center area thereof starts to sink. The grid cannot follow up the sinking of the top surface of the solid catalyst packed bed, and as a result, a space is also inevitably created between the top surface of the solid catalyst packed bed and the grid. Due to the presence of these spaces, the solid catalyst vigorously moves and is further abraded, and finally assumes the state shown in FIG. 15.

Contrary to this, FIGS. 12 and 13 are diagrams illustrating the relationship between the solid catalyst packed bed, the lower packed bed, and the upper deformation packed bed of the apparatus of the fourth configuration of the present invention. FIG. 12 shows a state soon after the initiation of the waste water treatment. FIG. 13 shows a state after long time has elapsed since the initiation of the waste water treatment.

The apparatus of the fourth configuration of the present invention has a lower packed bed. The lower packed bed mitigates the collision of the waste water so as to prevent the abrasion of the bottom area of the solid catalyst packed bed. No space is substantially created between the bottom of the solid catalyst packed bed and the lower packed bed. In addition, even if the top surface of the solid catalyst packed bed sinks, the upper deformation packed bed successfully follows up the sinking of the solid catalyst packed bed, and no space is substantially created between the solid catalyst packed bed and the upper deformation packed bed. With this arrangement, even after long time has elapsed, the solid catalyst packed bed is kept in the state shown in FIG. 13 where the movement thereof is effectively suppressed in the solid catalyst packed bed, thereby solving the problem of deterioration of performance due to the abrasion thereof, an increase in pressure loss, and the like.

As described above, the lower packed bed is effective in preventing the waste water blown off from the nozzle, or the hole of the single-hole or perforated plate from strongly colliding with the solid catalyst. As a result, a space undesirable for the waste water treatment is not created substantially at the bottom area of the solid catalyst packed bed. The lower packed bed is also effective in dispersing the waste water so as to prevent it from drifting. In addition, when the fourth configuration is provided with the upper deformation packed bed on the solid catalyst packed bed, it is possible to simultaneously attain the effects of the first configurations. That is, even if the top surface of the solid catalyst packed bed nonuniformly sinks, the upper deformation packed bed deforms in accordance with the sinking of the top surface of the solid catalyst packed bed. The upper deformation packed bed substantially prevents the formation of undesirable space between the top surface of the solid catalyst packed bed and the upper deformation packed bed.

Under the lower packed bed, it is effective to provide a support member which sustains the load of the solid catalyst packed bed and the lower packed bed. With the presence of the support member, the solid catalyst and the substance of the lower packed bed can be packed into the reaction tower in a stable manner, and the waste water can be supplied to the solid catalyst packed bed without drifting. The support member is not specifically limited, and may be selected from conventional support members generally used in waste water treatment (for example, a wire netting, a single or perforated plate, a grid, and the like) in accordance with the usage. Usually, it is recommended to provide a wire and a grid under the lower packed bed. Alternatively, one or a plurality of single-hole or perforated plates may be provided under the grid.

In the apparatus of the fifth configuration of the present invention, a reaction tower includes a lower packed bed, a solid catalyst packed bed, and an upper deformation packed bed in this order along a direction from the bottom to the top thereof. The upper part of the solid catalyst packed bed and the upper deformation packed bed are divided into a plurality of segments by a partition in a vertical direction. This structure enables to attain all the effects of the lower packed bed, the upper deformation packed bed, and the vertical partition, and therefore, is very effective.

The apparatus of the third configuration of the present invention has a single structure including the lower packed bed and the solid catalyst packed bed. The apparatus of the fourth configuration of the present invention also has a single structure including the lower packed bed, the solid catalyst, and the upper deformation packed bed. The apparatus of the fifth configuration of the present invention has the same single structure as of the fourth configuration except that it further includes the vertical partition. These configurations may be combined with each other to form a one-piece apparatus of multiple structure.

Or alternatively, the third to fifth configurations may be combined together into one vessel, and the vessel is provided into the reaction tower.

Next, the apparatus of the sixth embodiment of the present invention (the sixth configuration) will be described. As described above, the apparatus of the sixth configuration has a structure including on the packed bed of the solid catalyst and/or solid adsorbent, a pressure layer having an ability of following up the movement of the solid catalyst packed bed. This structure exhibits especially high effect when the reaction tower has a small inner diameter, specifically, about 300 mm or smaller (preferably 100 mm or smaller).

The term "the pressure layer having an ability of following up the movement of the solid catalyst packed bed" (hereinafter, referred to as "an upper movement packed bed" again.) has a load enough to substantially prevent the movement of the solid catalyst packed bed, and follows up the movement of the solid catalyst packed bed. Even if the top surface of the solid catalyst packed bed deforms, for example sinks, the upper movement packed bed deforms and sinks in accordance with the sinking of the top surface of the solid catalyst packed bed. As a result, the abrasion of the solid catalyst packed bed caused by its movement can be effectively prevented. As described above, the upper movement packed bed is effective when the reaction tower has a small inner diameter. In the case where the reaction tower has a small inner diameter, the solid catalyst generally sinks in parallel to (i.e. uniformally) the surface coming into contact with the upper deformation packed bed. Therefore, it is considered that there scarcely occurs a problem which is likely to occur in the reaction tower having a large inner diameter (that is, the solid catalyst sinks nonuniformly, resulting in the formation of a space between the solid catalyst packed bed and the upper deformation packed bed.).

The upper movement packed bed is intended for use in a reaction tower having a small inner diameter, and has A water-permeability at the level that prevents the waste water from drifting by the presence of the space between the upper movement packed bed and the reaction tower. Unlike the above-described upper deformation packed bed, the water-permeability is not the important requirement for the upper movement packed bed. For example, the upper movement packed bed may have no water-permeability, may be constituted by substance, such as a stick constituted by SUS.

The upper movement packed bed in the present invention is not specifically limited, as far as it gives sufficient pressure to the solid catalyst packed layer and follows up the movement thereof. Especially preferable is an upper movement packed bed of which contact surface with the top surface of the solid catalyst packed bed is constituted by metal in the form of stick, agglomerate, or column, such as a wire netting or a plate. The upper movement packed bed is also required to have a shape and size so as to just fit inside the reaction tower, and to follow up the sinking of the solid catalyst packed bed, and also to create no space through which the solid catalyst may pass.

The upper movement packed bed is preferably constituted by metal. Typically, the upper movement packed bed is constituted by iron, copper, stainless, Hastelloy (trademark), Inconel (trademark), titanium, zirconium, and the like. Among them, preferable for use in the wet-oxidation method is the upper movement packed bed constituted by stainless, Hastelloy (trademark), Inconel (trademark), titanium, zirconium, and the like, and especially preferable is constituted by stainless.

The apparatus of the seventh apparatus of the present invention includes a reaction tower in which a lower packed bed, a solid catalyst packed bed, an upper movement packed bed are provided in this order along the direction from the bottom to the top thereof. This structure attains all the effects of the lower packed bed and the upper movement packed bed, and therefore, is effective.

The apparatus of the sixth configuration of the present invention has a single structure including the solid catalyst packed bed and the upper movement packed bed. The apparatus of the seventh configuration of the present invention has a single structure including the lower packed bed, the solid catalyst, and the upper movement packed bed. These configurations may be combined with each other to form a one-piece apparatus of multiple structure.

Or alternatively, the sixth and seventh configurations may be combined together into one vessel, and the vessel is provided into the reaction tower.

The constituent elements of each configuration of the present invention have been described above. The solid catalyst and the solid adsorbent used are common to these configurations, and are not specifically limited to specific kinds. The solid catalyst and the solid adsorbents may be selected from those generally used in waste water treatment.

Examples of the solid catalyst used in the present invention include catalysts containing titanium, iron, aluminum, silicon, zirconium, activated charcoal, and the like. Among them, especially preferable are oxides of titanium, titanium-zirconium, titanium-iron, and the like. The catalyst may contain, in addition to the above-described component (i.e. the first component), another component (i.e. the second component). Examples of the second component include at least one metal selected from manganese, cobalt, nickel, tungsten, copper, cerium, silver, platinum, palladium, rhodium, gold, iridium, ruthenium, or metallic compounds thereof. The catalyst preferably contains 25 to 0.05 weight percent of the second component with respect to 75 to 99.95 weight percent of the first component.

The shape of the solid catalyst is not specifically limited, and the catalyst of the shape generally used for waste water treatment may be used. Usually used is the solid catalyst having the shape of sphere, pellet, ring, or honeycomb.

The solid adsorbent may be selected from those of kinds and shapes generally used in waste water treatment. Examples of the solid adsorbent include solid adsorbents containing titanium, iron, aluminum, silicon, zirconium, or activated charcoal. Among them, preferable are solid adsorbents containing oxides of titanium, titanium-zirconium, titanium-iron and the like. The shape of the solid adsorbent is sphere, pellet, ring, or honeycomb.

The solid adsorbent may be used alone or in combination with the solid catalyst.

The solid catalyst and solid adsorbent is not specifically limited to have specific sizes, and may be those of sizes generally used in waste water treatment. Preferably, the solid catalyst or solid adsorbent has a particle diameter of 1 to 50 mm. That is, when waste water is treated using the solid catalyst and/or solid adsorbent with a particle diameter of 1 to 50 mm, the movement thereof is effectively prevented, thereby solving a problem of the deterioration of performance of the solid catalyst and/or solid adsorbent and an increase in pressure loss. Further effect can be obtained when the solid catalyst and/or solid adsorbent used has a particle diameter of 1.5 mm to 30 mm, and preferably 2 mm to 10 mm.

Hereinafter, the method for treating waste water through the use of apparatus of the present invention will be described in detail.

In treating waste water for purification, the waste water is introduced into the reaction tower of the apparatus of the present invention alone or in combination with gas. The apparatus of the present invention is capable of purifying various kinds of waste water discharged from industrial plants such as chemical plants, food processing plants, metal processing plants, plating plants, printing plate making plants, photographic processing plants and the like in a stable manner for a long period of time. The apparatus of the present invention is especially effective in treating waste water having high chemical oxygen demand (COD). The waste water to be treated may be included pH adjusting agents and the like, or may be diluted with diluent.

Examples of the gas used in the present invention include: oxygen-containing gases such as the air, ozone, oxygen, oxygen-enriched gas; gases of hydrogen and ammonium; waste gas generated through waste water treatment such as gases of nitrogen, ammonium, carbon dioxide; vapor, and the like.

The flowing direction of the waste water, or waste water and gas in the reaction tower in the present invention is not specifically limited. However, the maximum effect of the present invention (i.e. effect of preventing the movement of the solid catalyst and of treating waste water in a stable manner for a long period of time) can be exploited more preferably when, in the case of introducing waste water only, the waste water is allowed to flow upward in the reaction tower; and when, in the case of introducing waste water and gas simultaneously, either one of them (preferably both of them) is allowed to flow upward in the reaction tower. The reason of this is as follows. If the waste water and/or gas flows downward, the solid catalyst is always pressed in a downward direction in the reaction tower. In this case, the abrasion of the solid catalyst by its movement is relatively small. Contrary to this, when waste water and/or gas flows upward, the solid catalyst moves vigorously in the reaction tower. In this case, the abrasion of the solid catalyst is large. This is the situation in which the apparatus of the present invention proves its usefulness.

The waste water is usually blown off from the nozzle or the hole of a single-hole or perforated plate at a linear velocity of 0.001 to 10 m/sec, and preferably 0.002 to 5 m/sec, and more preferably 0.003 m/sec to 3 m/sec. At too low linear velocity, the abrasion of the solid catalyst is small, especially in the case where waste water is introduced alone without gas. In this case, there is no need to provide the lower packed bed. Contrary to this, at too high linear velocity, the abrasion of the solid catalyst is too large, and is not preferable.

The gas is usually blown off from the nozzle or the hole of the single-hole or perforated plate at a linear velocity of 0.001 to 30 m/sec, and preferably 0.002 to 20 m/sec, and more preferably 0.003 m/sec to 10 m/sec. At too small linear velocity, the abrasion of the solid catalyst is small, and in this case, there is no need to provide the lower packed bed. Contrary to this, at too high linear velocity, the abrasion of the solid catalyst is too large, and is not preferable.

The linear velocity of waste water and gas is obtained from the volume of the waste water and the gas passing through the nozzle or the hole of single-hole or perforated plate at its cross-sectional area per unit time. The volume of the waste water is calculated from the entire waste liquid including pH adjusting agents, agents used for any purposes of waste water treatment, diluents and the like. The volume of the gas is calculated under the treatment pressure and temperature.

There is no limitation on the linear velocity of the waste water and gas flowing in the reaction tower. However, the movement of the solid catalyst can be efficiently prevented when the waste water is allowed to flow in the reaction tower at a linear velocity of 0.3 to 120 m/h. If the waste water flows at a linear velocity of lower than 0.3 m/h without the presence of gas, the movement of the solid catalyst is not large, and therefore, the abrasion thereof is not large. Contrary to this, if the waste water is allowed to flow at the linear velocity of higher than 120 m/h, the abrasion of the solid catalyst is relatively large. The more preferable linear velocity of the waste water is 1.0 m/h to 60 m/h, and the most preferably 2.0 m/h to 30 m/h. The preferable linear velocity of the gas is 500 m/h or lower, and more preferably 300 m/h, and the most preferably 150 m/h. If the gas flows at a linear velocity of higher than 500 m/h, the abrasion of the solid catalyst is large.

The linear velocity of waste water and gas is obtained from the volume of the waste water and the gas passing through the nozzle or the hole of single-hole or perforated plate at its cross-sectional area per unit time. The volume of the waste water is calculated from the entire waste liquid including pH adjusting agents, agents used for any purposes of waste water treatment, diluents and the like. The volume of the gas is calculated under the treatment pressure and temperature.

The size of the reaction tower or reactor filled with the solid catalyst packed bed and lower/upper packed bed is not specifically limited, and reaction towers or reactors of any sizes generally used in waste water treatment may be used. However, it is preferable to use a reaction tower having a size of about 20 to 3000 mm (more preferably 100 mm to 2500 mm, and the most preferably 300 mm to 2000 mm).

Which to use among the upper movement packed bed, the upper deformation packed bed, and the combination of the upper deformation packed bed and the partition may be properly selected in accordance with the inner diameter of the reaction tower.

In general, for example, when the reaction tower has an inner diameter of smaller than 20 mm, there is no need to use the upper movement packed bed. When the inner diameter of smaller than 50 mm for example, the movement of the solid catalyst can be prevented to some extent by a conventional fixed pressure member. When the reaction tower has an inner diameter of 20 to 300 mm, and preferably 100 mm or smaller, the upper movement packed bed is very effective in preventing the movement of the solid catalyst.

If the inner diameter of the reaction tower is about 100 mm or larger, and still larger than 300 mm, the solid catalyst moves vigorously. The movement is so vigorous that the upper movement packed bed cannot sufficiently suppress it. In this case, it is recommended to use the upper deformation packed bed, instead of the upper movement packed bed.

If the reaction tower has still larger inner diameter, specifically, 350 mm or larger, and still 510 mm or larger, it is recommended to divide the inner area of the reaction tower or the reactor into a plurality of segments by the vertical partitions.

The apparatus of the present invention is applicable to various methods for treating waste water, such as a wet-oxidation method, a wet-decomposing method, an ozone-oxidation method, a peroxide-oxidation method, and the like. Among them, the apparatus of the present invention is preferable for use in the wet-oxidation method and the ozone-oxidation method, due to the following reason. In the wet-oxidation method and the ozone-oxidation method, the waste water is supplied into the reaction tower together with gas containing oxygen and/or ozone. The solid catalyst moves in accordance with the movement of the waste water and the gas, and is easily abraded.

The apparatus of the present invention is especially preferable for use in the wet-oxidation method. In the wet-oxidation method, the waste water is heated to high temperature at high pressure while oxygen-containing gas is supplied thereto. In many cases, the waste water and the oxygen-containing gas are allowed to flow upward from the bottom to the top of the reaction tower. In addition, in order to treat the waste water under high pressure, the pressure is controlled to high, but varies to some extent. Due to the variation of the pressure, the volume of the oxygen-containing gas easily changes. In this state, the waste water and the oxygen-containing gas flow actively, resulting in large abrasion of the solid catalyst.

Hereinafter, the method or treating waste water of the present invention will be described, taking the wet-oxidation method as an example.

The term "the wet-oxidation method" means a method for purifying waste water in which waste water is heated to 100° C. to 370° C., and an oxygen-containing gas is introduced under a pressure that keeps the waste water in a liquid phase. Preferably, the maximum temperature of the waste water in the reaction tower is 100 to 370° C., and more preferably 150 to 300° C. At a temperature higher than 370° C., the waste water cannot be kept in a liquid phase. At a temperature of 300° C. or higher, it is required to give remarkably high pressure for keeping the waste water in a liquid phase. In this case, high equipment cost and running cost are incurred. On the other hand, at a temperature lower than 100° C., the treatment efficiency is remarkably lowered. Even at a temperature lower than 150° C., the treatment efficiency is usually low and the waste water cannot be sufficiently purified. The treatment pressure is determined in relation to the treatment temperature. The wet-oxidation method is conducted at a pressure that keeps the waste water in a liquid phase.

The space velocity of the waste water with respect to the reaction tower is preferably 0.1 $hr^{-1}$ to 10 $hr^{-1}$. At a space velocity of lower than 0.1 $hr^{-1}$, only small amount of waste water can flow in the reaction tower. In this case, large equipment is required. On the other hand, at a space velocity of higher than 10 $hr^{-1}$, the treatment efficiency is lowered, and this is not preferable. More preferable space velocity is 0.3 hr$^{-1}$ to 5 hr$^{-1}$.

The term "the oxygen-containing gas" means a gas containing oxygen in the state of molecules or ozone. When a gas of ozone or oxygen is used, such a gas is properly diluted by inert gas before used. Also may be used oxygen-enriched gas and waste gas containing oxygen which is discharged from another industrial plants. Among them, the most preferable is the air of which cost is low.

The oxygen-containing gas is preferably supplied into the reaction tower from the bottom part thereof for the following reason. When oxygen-containing gas is supplied into the reaction tower filled with waste water from the lower part thereof, the oxygen-containing gas flows upward through the waste water, and spreads all over the reaction tower by itself. In the wet-oxidation method thus arranged, the waste water can be highly purified and the operation of the waste water treatment apparatus can be simplified.

The waste gas is preferably discharged out of the reaction tower from the upper part thereof, and more preferably from the top thereof. In addition, the treated liquid is also preferably discharged out of the reaction tower from the top thereof. The most preferably, the waste gas and treated liquid are discharged together.

The amount of the oxygen-containing gas supplied is not specifically limited, and is adjusted taking into consideration the kind of waste water to be treated, the aim of the treatment, the conditions of treatment, and the like.

The apparatus for waste water treatment by wet-oxidation method is not specifically limited, and may be selected from those conventionally used. The reaction tower for waste water treatment by wet-oxidation method may be in the form of single-tube or multiple-tube, and preferable is the form of single-tube. In the description of the waste water treatment above, the expression "the reaction tower" may be replaced with "a reaction tube or reaction vessel" or "a packed tower, packed tube, or packed vessel".

Hereinafter, the present invention will be further described by way of examples.

EXAMPLE 1

The Apparatus of the Fourth Configuration

By use of the wet-oxidation treatment apparatus shown in FIG. 1, waste water was treated for 500 hours in total under the following conditions.

In the treatment, used was a solid catalyst including titania and platinum as main components. The weight ratio of the titania and the platinum was 99:1.0 converted $TiO_2$:Pt. The solid catalyst had a shape of pellet having a diameter of 4 mm ø and a length of 7 mm (an average particle diameter of 8.1 mm). The solid catalyst in an amount of 500 liters was charged into a cylinder-shaped reaction tower having a diameter of 300 mm and a length of 8000 mm to form a solid catalyst packed bed. On the solid catalyst packed bed, column-shaped pellets constituted by SUS (an average particle diameter of 8.5 mm) having a diameter of 6 mm and a length of 5 to 8 mm (an average length of 6.5 mm) were provided to the height of 150 mm to form a packed bed. The pellets had a specific gravity of about 7.9 g/cm$^3$ and a void percentage of 43 percent. Under the solid catalyst packed bed, the same type of pellets constituted by SUS as those provided on the solid catalyst packed bed were provided to the height of 100 mm to form a packed bed. The SUS pellet packed bed provided under the solid catalyst packed bed was supported on a support member constituted by grid and a wire netting mounted in the reaction tower.

The waste treatment was treated in the following steps. First, the waste water supplied through a waste water supplying line 10 was pressurized to flow at a flow rate of 1 m$^3$/hr by a waste water supplying pump 3 and was sent toward the reaction tower. Then, the maximum temperature inside a reaction tower 1 measured at a heat exchanger 2 was adjusted to 250° C. by a bypass regulating valve 8. After that, the waste water was supplied into a reaction tower 1 from the bottom thereof. On the other hand, the air was supplied through an oxygen-containing gas supplying line 11, and then was pressurized by a compressor 4. The air was then supplied upstream of the heat exchanger 2 at a ratio of $O_2$/COD (Cr) (i.e. the amount of oxygen in the air/chemical oxygen demand), and was mixed with the waste water. The purified water obtained by the wet-oxidation treatment was introduced through a treated liquid line 12 to a cooler 9 so as to be cooled, and then, was subjected to a gas-liquid separation treatment in a gas-liquid separator 5. In the gas-liquid separator 5, the liquid surface was detected by a liquid surface controller (LC), and was kept to be constant by a liquid phase control valve 6. At the same time, the pressure of the liquid surface was detected by a pressure controller (PC), and was kept to 70 kg/cm$^2$G by a pressure control valve 7. Then, the treated liquid was discharged out of the reaction tower through a treat liquid discharging line 14. At the initiation of the treatment, the inlet pressure (PI) of the reaction tower was 72 kg/cm$^2$G.

The waste water treated in Example 1 had COD (Cr) of 43 g/liter and pH of 3.7. The treated liquid obtained after the elapse of 500 hours from the initiation of the treatment had COD (Cr) of 0.3 g/liter and pH of 5.6 The inlet pressure (PI) of the reaction tower after the elapse of 500 hours from the initiation of the treatment was 72 kg/cm$^2$G.

After 500 hours elapsed, the treatment was stopped, and the upper part of the reaction tower was opened and the SUS pellet packed bed was removed to measure the sinking height of the solid catalyst packed bed. As a result of measurement, it was found that the solid catalyst packed bed sank to a depth of 5 cm. The solid catalyst was removed from the reaction tower to observe its shape. No change in the shape thereof was observed.

Comparative Example 1

Waste water was treated repeating the steps of EXAMPLE 1, except that no pellets constituted by SUS were provided on and under the solid catalyst packed bed, and the solid catalyst was directly charged on the wire netting used as a supporting member. The inlet pressure (PI) of the reaction tower at the initiation of treatment was 72 kg/cm$^2$G The treated water obtained after the elapse of 500 hours had COD (Cr) of 0.7 g/liter and pH of 5.5. The inlet pressure (PI) of the reaction tower after the elapse of 500 hours was 74 kg/cm$^2$G.

After 500 hours elapsed, the treatment was stopped, and the upper part of the reaction tower was opened to measure the sinking height of the solid catalyst packed bed. As a result of measurement, it was found that the solid catalyst packed bed sank to a depth of 31 cm on the average, assuming the form of mortar. The solid catalyst was taken out of the reaction tower to observe its shape. As a result of observation, it was found that the solid catalyst located at the upper part and the lower part of the reaction tower was abraded to be smaller in size.

EXAMPLE 2

The Apparatus of the Seventh Configuration

Waste water was treated repeating the steps of Example 1, except that, instead of pellets constituted by SUS, another member was provided on the solid catalyst packed bed. The member was a pressure member having an ability of following up the movement of the solid catalyst (the pressure member was a column-shaped vessel of which bottom surface was constituted by SUS wire netting, and had a diameter of 296 mm and a height of 500 mm which just fitted inside the reaction tower). Inside the SUS pressure member, the same SUS pellets as used in Example 1 were charged to the height of 130 mm. The inlet pressure (PI) of the reaction tower at the initiation of treatment was 72 kg/cm$^2$G.

The treated liquid obtained after the elapse of 500 hours had COD (Cr) of 0.7 g/liter, and pH of 5.5. The Inlet pressure (PI) of the reaction tower was 74 kg/cm$^2$G.

After 500 hours elapsed, the treatment was stopped, and the upper part of the reaction tower was opened and the SUS pellet packed bed was removed to measure the sinking height of the solid catalyst packed bed. As a result of measurement, it was found that the solid catalyst packed bed sank to a depth of 14 cm on the average, assuming the form of mortar. The solid catalyst was taken out of the reaction tower to observe its shape. As a result of observation, it was found that the solid catalyst located at the upper part of the reaction tower was abraded to be smaller in size.

EXAMPLE 3

The Apparatus of the First Configuration

Waste Water was treated by repeating the steps of Example 1, except for the followings. That is, no pellets constituted by SUS were charged under the solid catalyst packed bed, and the solid catalyst packed bed was directly provided on the wire netting used as a support member. In addition, the amount of the waste water supplied decreased to 0.3 m$^3$/hr, and the amount of the air supplied decreased accordingly.

The inlet pressure (PI) of the reaction tower at the initiation of the treatment was 71 kg/cm$^2$G.

The waste water treated in Example 3 had COD (Cr) of 39 g/liter and pH of 3.7. Contrary to this, the treated liquid obtained after the elapse of 500 hours had COD (Cr) of 0.1 g/liter and pH of 5.7. The inlet pressure (PI) of the reaction tower after the elapse of 500 hours was 71 kg/cm$^2$G.

After the elapse of 500 hours, the treatment was stopped, and the upper part of the reaction tower was opened and the SUS pellet packed bed was removed to measure the sinking height of the solid catalyst packed bed. As a result of measurement, it was found that the solid catalyst packed bed sank to a depth of 4 cm on the average. The solid catalyst was taken out of the reaction tower to observe its shape. No change in the shape of the solid catalyst was observed.

Comparative Example 2

Waste water was treated by repeating the steps of Example 3, except that no pellets constituted by SUS were charged on the solid catalyst packed bed, and only the solid catalyst was charged in a reaction tower. The inlet pressure (PI) of the reaction tower was 71 kg/cm$^2$G.

The treated liquid obtained after the elapse of 500 hours had COD (Cr) of 0.3 g/liter and pH of 5.6. The inlet pressure (PI) of the reaction tower after the elapse of 500 hours increased to 73 kg/cm$^2$G.

After the elapse of 500 hours, the treatment was stopped, and the upper part of the reaction tower was opened to measure the sinking height of the solid catalyst packed bed. As a result of measurement, it was found that the solid catalyst packed bed sank to a depth of 21 cm on the average, assuming the form of mortar. The solid catalyst was taken out of the reaction tower to observe its shape. As a result of observation, it was found that the solid catalyst located at the upper part of the reaction tower was abraded to be smaller in size.

EXAMPLE 4

The Apparatus of the Fourth Configuration

Waste water was treated for 500 hours by repeating the steps of Example 1 using the wet-oxidation treatment apparatus shown in FIG. 1, except for the conditions described below.

The solid catalyst used contained a composite oxide of titanium and zirconium, and palladium in the treatment. The weight ratio thereof was 49.5:49.5:1.0 converted by TiO$_2$:ZrO$_2$:Pd. The solid catalyst had a shape of pellet having a diameter of 2.5 mm ø and a length of 5 mm (an average particle diameter of 5.6 mm). The solid catalyst in an amount of 1.5 m$^3$ was charged into a cylinder-shaped reaction tower having a diameter of 600 mm and a length of 7000 mm to form a solid catalyst packed bed. On the solid catalyst packed bed, balls constituted by SUS in the shape of sphere having an average diameter (an average particle diameter) of 8 mm was charged to the height of 250 mm to form a packed bed. The SUS balls had a specific gravity of about 7.9 g/cm$^3$, and a void percentage of 39 percent. Under the solid catalyst packed bed, the same type of balls constituted by SUS as those provided on the solid catalyst packed bed were charged to the height of 100 mm. The SUS ball packed bed under the solid catalyst packed bed was supported by a support member constituted by grid and wire netting mounted in the reaction tower. Under the grid, that is at the bottom area of the reaction tower, a single-hole dispersion plate and a perforated dispersion plate were disposed in this order from the bottom to the top of the reaction tower. On the SUS ball packed bed provided on the solid catalyst packed bed, a fixed pressure member constituted by wire netting and grid was further provided.

The amount of the waste water supplied was 2.3 m$^3$/hr, and the amount of the air supplied was adjusted so that the ratio of O$_2$/COD (Cr) was 1.2. The maximum temperature of the reaction tower was adjusted to 260° C. The inlet pressure (PI) of the reaction tower was 77 kg/cm$^2$G.

The waste water treated in Example 4 had COD (Cr) of 38 g/liter and pH of 7.2. The treated liquid obtained after the elapse of 500 hours had COD (Cr) of 0.8 g/liter and pH of 6.3. After the elapse of 500 hours, the inlet pressure (PI) of the reaction tower was 77 kg/cm$^2$G.

After the elapse of 500 hours, the treatment was stopped, and the upper part of the reaction tower was opened and the SUS ball packed bed was removed to measure the sinking height of the solid catalyst packed bed. As a result of measurement, it was found that the solid catalyst packed bed sank to a depth of 11 cm on the average. The solid catalyst was taken out of the reaction tower to observe its shape. No change in the shape of the solid catalyst was observed.

Comparative Example 3

Waste water was treated by repeating the steps of Example 4, except that no balls constituted by SUS were provided on and under the solid catalyst packed bed. On the solid catalyst packed bed, a fixed pressure member constituted by wire netting and grid was provided to give a pressure to the solid catalyst packed bed. Between the solid catalyst packed bed and the wire netting, there was no space. The inlet pressure (PI) of the reaction tower at the initiation of treatment was 77 kg/cm$^2$G.

After the elapse of about 370 hours, the inlet pressure (PI) of the reaction tower increased to 80 kg/cm$^2$G. The treatment was stopped, and the upper part of the reaction tower was opened to observe its inner state. It was observed that the solid catalyst was abraded and broken, and the solid catalyst packed layer was clogged to some extent.

EXAMPLE 5

The Apparatus of the Sixth Apparatus

Waste water was treated by repeating the steps of Example 1 using the wet-oxidation treatment apparatus shown in FIG. 1, except that the apparatus had no lower packed bed 23 and the treatment was conducted under the conditions described below. The treatment was conducted for 500 hours in total.

The solid catalyst contained an oxide of zirconium and iron as a main component, a composite oxide thereof, and ruthenium at a weight ratio of 79.5:19.5:1.0 converted by $ZrO_2$:$Fe_2O_3$:Ru. The solid catalyst had a shape of pellet having a diameter of 2.5 mm ø and a length of 5 mm (an average particle diameter of 5.6 mm). The solid catalyst in an amount of 1.0 liter was charged into a cylinder-shaped reaction tower having a diameter of 26 mm and a length of 3000 mm to form a solid catalyst packed bed. On the solid catalyst packed bed, a circular column-shaped stick constituted by SUS having a diameter of 24 mm and a length of 1 m was provided. The solid catalyst was charged on a support member constituted by grid and wire netting.

The flow rate of the waste water was 2.0 liter/hr, and the amount of the air supplied was adjusted so that the ratio of $O_2$/COD (Cr) was 2.0. The reaction temperature was adjusted to 250° C. The inlet pressure (PI) of the reaction tower at the initiation of the treatment was 75 kg/cm$^2$G.

The waste water treated in Example 5 had COD (Cr) of 24 g/liter and pH of 10.4. The treated liquid obtained after the elapse of 500 hours had COD (Cr) of 0.6 g/liter and pH of 8.7. The inlet pressure (PI) of the reaction tower after the elapse of 500 hours was 75 kg/cm$^2$G.

After the elapse of 500 hours, the treatment was stopped, and the upper part of the reaction tower was opened and the SUS circular column-shaped pressure member was removed to measure the sinking height of the solid catalyst packed bed. As a result of measurement, it was found that the solid catalyst packed bed sank to a depth of 5 cm on the average. The solid catalyst was taken out of the reaction tower to observe its shape. No change in the shape of the solid catalyst was observed.

Comparative Example 4

Waste water was treated by repeating the steps of Example 5, except that no circular column-shaped pressure member constituted by SUS was provided on the solid catalyst packed bed. The inlet pressure (PI) of the reaction tower at the initiation of the treatment was 75 kg/cm$^2$G.

The treated liquid obtained after the elapse of 500 hours had COD (Cr) of 0.7 g/liter and pH of 8.8, and the inlet pressure of the reaction tower (PI) after the elapse of 500 hours was 75 kg/cm$^2$G.

After the elapse of 500 hours, the treatment was stopped, and the upper pat of the reaction tower was opened to measure the sinking height of the solid catalyst packed bed. As a result of measurement, it was found that the solid catalyst packed bed sank to a depth of 18 cm on the average. The solid catalyst was taken out of the reaction tower to observe its shape. It was found that the solid catalyst located at the upper part of the reaction tower was abraded to be smaller in size.

EXAMPLE 6

The apparatus of the Fourth Configuration

Figure 2:
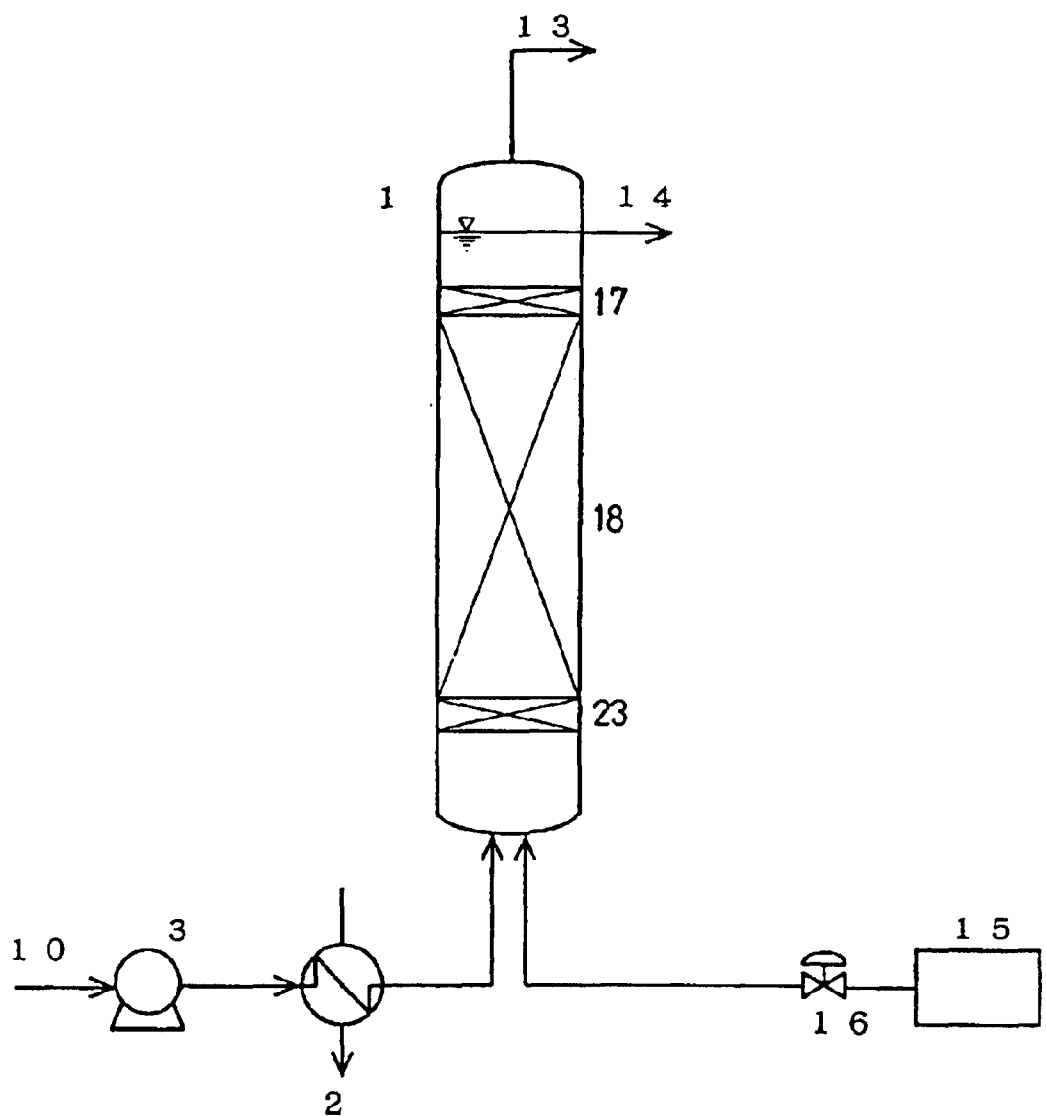
FIG. 2 is a schematic diagram showing another method for treating waste water using an apparatus of the present invention.

Waste water was treated using an ozone-oxidation treatment apparatus shown in FIG. 2 under the conditions described below for 500 hours.

The solid catalyst used contained titania and manganese as main components at a weight ratio of 95:5 converted by $TiO_2$:$MnO_2$. The solid catalyst had a shape of pellet having a diameter of 5 mm ø and a length of 7 mm (an average particle diameter of 8.6 mm). The solid catalyst in an amount of 30 liters was charged into a reaction tower to form a solid catalyst packed bed. The reaction tower had a shape of cylinder having an inner diameter of 92 mm and a height of 6.0 m. On the solid catalyst packed bed, balls constituted by zirconia in the form of sphere having an average diameter (an average particle diameter) of 12 mm was charged to the height of 50 mm to form a packed bed. The zirconia balls had a specific gravity of about 5.5 g/cm$^3$ and a void percentage of 40 percent. Under the solid catalyst packed bed, the same type of zirconia balls as those charged on the solid catalyst packed bed was provided to the height of 50 mm to form a packed bed.

The waste treatment was treated in the following steps. First, the waste water supplied through a waste water supplying line 10 was pressurized to flow at a flow rate of 30 liter/hr by a waste water supplying pump 3. Then, the temperature of the waste water was adjusted to 25° C. by a heat exchanger 2, and the waste water was supplied into the reaction tower 1 from the bottom thereof. On the other hand, an ozone-containing gas (having an ozone concentration of 100 g/m$^3$) was generated by an ozone generator 15, and was controlled to flow at a flow rate of 0.71 Nm$^3$/h by a gas flow rate regulating valve 16. Then, the gas was introduced into the reaction tower 1 from the bottom thereof.

The waste water treated in Example 6 had COD (Cr) of 720 mg/liter and pH of 7.6. The treated liquid obtained after the elapse of 500 hours from the initiation of the treatment had COD (Cr) of 60 mg/liter and pH of 4.3.

After the elapse of 500 hours, the treatment was stopped, and the upper part of the reaction tower was opened and the zirconium ball packed bed was removed to measure the sinking height of the solid catalyst packed bed. As a result of measurement, it was found that the solid catalyst packed bed sank to a depth of 3 cm. The solid catalyst was taken out of the reaction tower to observe its shape. No change in the shape thereof was observed.

Comparative Example 5

Waste water was treated by repeating the steps of Example 6, except that no zirconium balls were provided on and under the solid catalyst packed bed.

The treated liquid obtained after the elapse of 500 hours had COD (Cr) of 75 mg/liter and pH of 4.4.

After the elapse of 500 hours, the treatment was stopped, and the upper part of the reaction tower was opened to measure the sinking height of the solid catalyst packed bed. As a result of measurement, it was found that the solid catalyst packed bed sank to a depth of 21 cm on the average. The solid catalyst was taken out the reaction tower to observe its shape. It was found that the solid catalyst located at the upper part and the lower part of the reaction tower was abraded to be smaller in size.

EXAMPLE 7

The Apparatus of the Fifth Configuration

Waste water was treated for 8000 hours in total using the wet-oxidation treatment apparatus shown in FIG. 1 under the conditions described below.

In the treatment, used was a solid catalyst including titania and platinum as main components at a weight ratio of 99:1.0 converted by $TiO_2$:Pt. The solid catalyst had a shape of pellet having a diameter of 4 mm ø and a length of 7 mm (an average particle diameter was 8.1 mm). The solid catalyst in an amount of 4 $m^3$ was charged into a cylinder-shaped reaction tower having a diameter of 1000 mm and a length of 7000 mm to form a solid catalyst packed bed. On the solid catalyst packed bed, balls constituted by SUS in the shape of sphere (an average particle diameter of 8 mm) were charged to the height of 350 mm to form a packed bed. The SUS balls had a specific gravity of about 7.9 $g/cm^3$ and a void percentage of 43 percent. Under the solid catalyst packed bed, the same type of SUS balls as those provided on the solid catalyst packed bed were charged to the height of 100 mm to form a packed bed.

At the upper part of the reaction tower, provided was a partition constituted by SUS, such as shown in FIG. 16, for dividing the SUS ball packed bed and the upper part of the solid catalyst into twenty-one segments in the form of dice in a vertical direction. The partition had a height of 100 cm in a vertical direction. The top of the partition and the top surface of the SUS ball packed bed were flush with each other. The partition was inserted into the solid catalyst to a depth 65 cm from the boundary area between the SUS ball solid catalyst and the solid catalyst packed bed.

The waste treatment was treated in the following steps. First, the waste water supplied through a waste water supplying line 10 was pressurized to flow at a flow rate of 8 $m^3$/hr by a waste water supplying pump 3, and was sent toward the reaction tower. Then, the maximum temperature inside a reaction tower 1 measured using a heat exchanger 2 was adjusted to 250° C. by a bypass regulating valve 8. After that, the waste water was supplied into a reaction tower 1 from the bottom thereof. On the other hand, the air was supplied through an oxygen-containing gas supplying line 11, and then was pressurized by a compressor 4. The air was then supplied upstream of the heat exchanger 2 at a ratio of $O_2$/COD (Cr) (i.e. the amount of oxygen in the air/chemical oxygen demand) is 1.2, and was mixed with the waste water. The treated liquid obtained by the wet-oxidation treatment was introduced through a treated liquid line 12 to a cooler 9 so as to be cooled, and then, was subjected to a gas-liquid separation treatment in a gas-liquid separator 5. In the gas-liquid separator 5, the liquid surface was detected by a liquid surface controller (LC), and was kept to be constant by a liquid surface control valve 6. At the same time, the pressure of the liquid surface was detected by a pressure controller (PC), and was kept to 70 $kg/cm^2G$ by a pressure control valve 7. Then, the treated liquid was discharged through a treated liquid discharging line 14. At the initiation of the treatment, the inlet pressure (PI) of the reaction tower was 72 $kg/cm^2G$.

The waste water treated in Example 7 had COD (Cr) of 36 g/liter and pH of 4.0. The treated liquid obtained after the elapse of 8000 hours had COD (Cr) of 0.2 g/liter and pH of 5.9. The inlet pressure (PI) of the reaction tower after the elapse of 8000 hours was 72 $kg/cm^2G$.

After the elapse of 8000 hours, the treatment was stopped, and the upper pat of the reaction tower was opened to measure the sinking height of the SUS ball packed bed. As a result of measurement, it was found that the SUS ball packed bed sank to a depth of 22 cm on the average, and 34 cm at the maximum. The SUS ball was removed from the reaction tower to observe the shape of the solid catalyst. No change in the shape thereof was observed.

Comparative Example 6

Waste water was treated by repeating the steps of Example 7, except that neither SUS balls nor partition were provided on and under the solid catalyst packed bed, and a fixed pressure member constituted by SUS wire netting and grid was provided on the solid catalyst packed bed in such a manner as to create no space in order to give pressure to the solid catalyst packed bed.

Soon after the initiation of the treatment, a large amount of the solid catalyst in the form powder was discharged into the waste water. After the elapse of about 40 hours, the treatment was stopped, and the upper part of the reaction tower was opened to observe its inside state. It was found that the solid catalyst packed bed sank to a depth of 41 cm on the average, assuming the form of mortar. In addition, the solid catalyst was abraded and broken to be smaller in size.

EXAMPLE 8

The Apparatus of Fourth Configuration

Waste water was treated for 8000 hours by repeating the steps of Example 7, except that no partition was provided.

The treated liquid obtained after the elapse of 8000 hours had COD (Cr) of 0.3 g/liter and pH of 5.8. The inlet pressure (PI) of the reaction tower after the elapse of 8000 hours was 72 $kg/cm^2G$.

After the elapse of 8000 hours, the treatment was stopped. The upper pat of the reaction tower was opened to measure the sinking height of the SUS ball packed bed. As a result of measurement, it was found that the SUS ball packed bed sank to a depth of 57 cm on the average. Then, the SUS ball packed bed was entirely removed from the reaction tower to observe the shape of the solid catalyst. No change in the shape thereof was observed.

EXAMPLE 9

The Apparatus of the First Configuration

Waste water was treated by repeating the steps of Example 1 for 8000 hours in total using the wet-oxidation treatment apparatus shown in FIG. 1, except for the conditions described below.

In the treatment, used was a solid catalyst including titania and platinum as main components at a weight ratio of 99.6:0.4 converted by $TiO_2$:Pt. The solid catalyst had a shape of pellet having a diameter of 5 mm ø and a length of 7 mm (an average particle diameter was 8.6 mm). The solid catalyst in an amount of 3.6 $m^3$ was charged into a cylinder-shaped reaction tower having a diameter of 800 mm and a length of 10000 mm to form a solid catalyst packed bed. The solid catalyst was charged on a support member constituted by grid and wire netting. Under the grid, that is and at the bottom area of the reaction tower, a single-hole dispersion plate and a perforated dispersion plate were placed in this order from the bottom to the top of the reaction tower. On the solid catalyst packed bed, balls constituted by SUS having a shape of sphere (an average diameter of 8 mm) were charged to a height of 250 mm to form a packed bed. The SUS balls had a specific gravity of about 7.9 g/cm$^3$ and a void percentage of 39 percent. On the SUS ball packed bed placed on the top of the solid catalyst packed bed, a fixed pressure member constituted by wire netting and grid was further provided.

The amount of the waste water was 1.8 m$^3$/hr, and the amount of the air was adjusted so that the ratio of O$_2$/COD (Cr) was 1.1. The maximum temperature of the reaction tower was adjusted to 240° C. The inlet pressure (PI) of the reaction tower was 60 kg/cm$^2$G.

The waste water treated in Example 9 had COD (Cr) of 33 g/liter and pH of 8.2. The treated liquid obtained after the elapse of 8000 hours had COD (Cr) of 0.3 g/liter and H of 7.2. After the elapse of 8000 hours, the inlet pressure (PI) of the reaction tower was 61 kg/cm$^2$G.

After the elapse of 8000 hours, the treatment was stopped, and the upper part of the reaction tower was opened to measure the sinking height of the SUS ball packed bed. As a result of measurement, it was found that the SUS ball packed bed sank to a depth of 26 cm. The solid catalyst was taken out of the reaction tower to observe its shape. No change in the shape thereof was observed.

EXAMPLE 10

The Apparatus of the Second Configuration

Waste water was treated by repeating the steps of Example 9, except that at the upper part of the reaction tower, provided was a partition constituted by SUS, such as shown in FIG. 16, for dividing the SUS ball packed bed and the upper part of the solid catalyst into twenty-one segments in the form of dice in a vertical direction. The partition had a height of 100 cm in a vertical direction. The top of the partition and the top surface of the SUS ball packed bed were flush with each other. The partition was inserted into the solid catalyst to a depth 75 cm from the boundary area between the SUS ball solid catalyst and the solid catalyst packed bed.

The treated liquid obtained after the elapse of 8000 hours from the initiation of the treatment had COD (Cr) of 0.3 g/liter and pH of 7.2. The inlet pressure (PI) of the reaction tower after the elapse of 8000 hours from the initiation of the treatment was 61 kg/cm$^2$G.

After the elapse of 8000 hours, the treatment was stopped, and the upper pat of the reaction tower was opened and the SUS ball packed bed was removed to measure the sinking height of the solid catalyst packed bed. As a result of measurement, it was found that the solid catalyst packed bed sank to a depth of 21 cm on the average, and 29 cm at the maximum. The solid catalyst was taken out of the reaction tower to observe its shape. No change in the shape thereof was observed.

Comparative Example 7

Waste water was treated by repeating the steps of Example 9, except that SUS ball were not provided on the solid catalyst packed bed, and a fixed pressure member constituted by SUS wire netting and grid was provided on the solid catalyst packed bed in such a manner as to create no space in order to give pressure to the solid catalyst packed bed.

Soon after the initiation of the treatment, a large amount of the solid catalyst in the form powder was discharged into the waste water. After the elapse of about 40 hours, the treatment was stopped, and the upper part of the reaction tower was opened to observe its inside state. It was found that the solid catalyst packed bed sank to a depth of 34 cm on the average, assuming the form of mortar. The solid catalyst located at the upper part of the reaction tower was abraded and broken to be smaller in size.

EXAMPLE 11

The Apparatus of the Fifth Configuration

Waste water was treated using the ozone-oxidation treatment apparatus shown in FIG. 2 for 500 hours under the conditions described below.

In the treatment, used was a solid catalyst containing titania and manganese as main components at a weight ratio of 95:5 converted by TiO$_2$:MnO$_2$. The solid catalyst had a shape of pellet having a diameter of 5 mm ø and a length of 7 mm (an average particle diameter of 8.6 mm). The solid catalyst in an amount of 1 m$^3$ was charged into a reaction tower to form a solid catalyst packed bed. The reaction tower had a shape of cylinder having an inner diameter of 500 mm and a height of 6.0 m. On the solid catalyst packed bed, balls constituted by zirconia in the form of sphere having an average diameter (an average particle diameter) of 12 mm was charged to the height of 250 mm to form a packed bed. The zirconia balls had a specific gravity of about 5.5 g/cm$^3$ and a void percentage of 40 volume percent. Under the solid catalyst packed bed, the same type of zirconia balls as those charged on the solid catalyst packed bed was charged to the height of 100 mm to form a packed bed.

Figure 17:
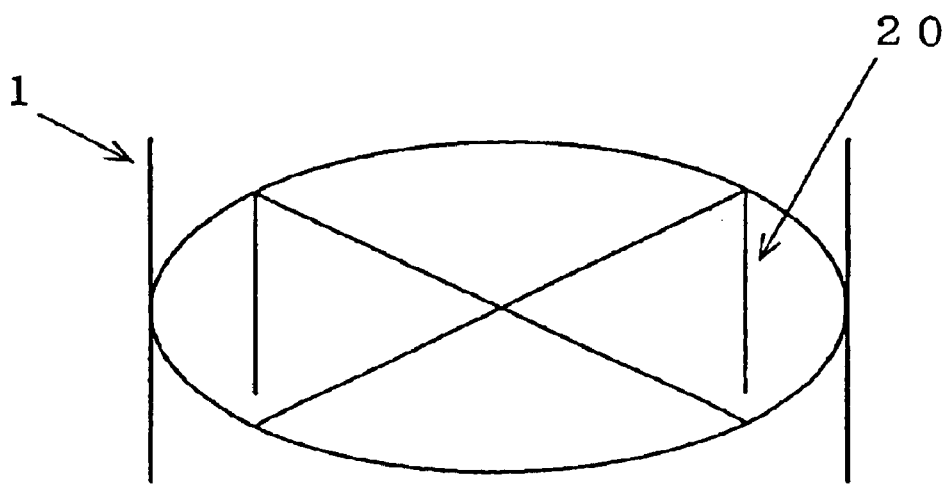
FIG. 17 is a schematic diagram showing another embodiment of partition in the apparatus of the second configuration of the present invention.

At the upper part of the reaction tower, provided was a partition constituted by SUS, such as shown in FIG. 17, for dividing the SUS ball packed bed and the upper part of the solid catalyst into four segments at an interval of about 25 cm in a vertical direction. The partition had a height of 75 cm in a vertical direction. The top of the partition and the top surface of the zirconia ball packed bed were flush with each other. The partition was inserted into the solid catalyst to a depth 50 cm from the boundary area between the zirconia ball packed bed and the solid catalyst packed bed.

The waste treatment was treated in the following steps. First, the waste water supplied through a waste water supplying line 10 was pressurized to flow at a flow rate of 1 m$^3$/hr by a waste water supplying pump 3. Then, the temperature of the waste water was adjusted to 25° C. by a heat exchanger 2 and was supplied into the reaction tower 1 from the bottom thereof. On the other hand, an ozone-containing gas (having an ozone concentration of 10 g/m$^3$) was generated by an ozone generator 15, and was controlled to flow at a flow rate of 24 Nm$^3$/h by a gas flow rate regulation valve 16. Then, the gas was introduced into the reaction tower 1 from the bottom thereof.

The waste water treated in Example 11 had COD (Cr) of 580 mg/liter and pH of 7.4. The treated liquid obtained after the elapse of 500 hours from the initiation of the treatment had COD (Cr) of 40 mg/liter and pH of 4.7.

After the elapse of 500 hours, the treatment was stopped, and the upper part of the reaction tower was opened to measure the sinking height of the zirconia ball packed bed. As a result of measurement, it was found that the zirconia ball packed bed sank to the dept of 13 cm on the average, and 19 cm at the maximum. The zirconia ball packed bed was entirely removed from the reaction tower to observe the shape of the solid catalyst. No change in the shape thereof was observed.

EXAMPLE 12

The Apparatus of Fourth Configuration

Waste water was treated by repeating the steps of Example 11, except that no partition was provided.

The treated liquid obtained after the elapse of 500 hours had COD (Cr) of 50 mg/liter and pH of 4.7.

After the elapse of 500 hours, the treatment was stopped. The upper part of the reaction tower was opened to measure the sinking height of the zirconia ball packed bed. As a result of measurement, it was found that the zirconia ball packed bed sank to a depth of 22 cm on the average, assuming the form of mortar. Then, the zirconia ball packed bed was entirely removed from the reaction tower to observe the shape of the solid catalyst. No change in the shape thereof was observed.

Comparative Example 8

Waste water was treated by repeating the steps of Example 11, except that neither SUS ball nor partition were provided on and under the solid catalyst packed bed, and a fixed pressure member constituted by SUS wire netting and grid was provided on the solid catalyst paced bed in such a manner as to create no space in order to give a pressure to the solid catalyst packed bed.

Soon after the initiation of the treatment, a large amount of the solid catalyst in the form powder was discharged into the waste water. After the elapse of about 100 hours, the treatment was stopped, and the upper part of the reaction tower was opened to observe its inside state. It was found that the solid catalyst packed bed sank to a depth of 26 cm on the average, assuming the form of mortar. The solid catalyst was taken out of the reaction tower to observe its shape. As a result of observation, it was found that the solid catalyst located at the upper part of the reaction tower was abraded and broken to be smaller in size.

EXAMPLE 13

The Apparatus of Fourth Configuration

Figure 3:
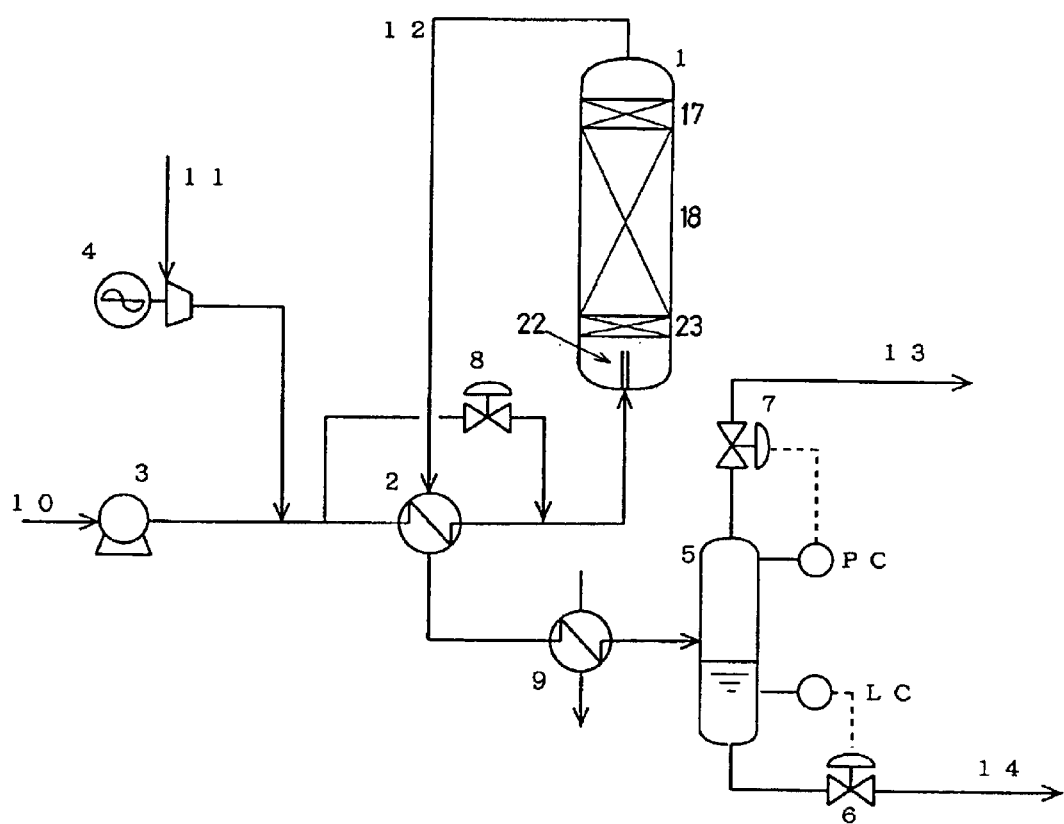
FIG. 3 is a schematic diagram showing still another method for treating waste water using an apparatus of the present invention.

Waste water was treated using the wet-oxidation treatment apparatus shown in FIG. 3 for 500 hours in total under the conditions described below.

The reaction tower used for treatment had a shape of cylinder having a diameter of 300 mm and a length of 8000 mm. From the center of the bottom surface of the reaction tower, a nozzle 15 having an inner diameter of 20 mm and a height of 300 mm projected upward in a vertical direction. At the lower part of the reaction tower, provided was a support member constituted by SUS wire netting of having six mesh (a wire diameter of 0.8 mm and an interval of segments of 3.43 mm) and a grid in order to support the weight of the solid catalyst. On the support member, SUS raschig rings in the shape of column were charged to the height of 100 mm to form a raschig ring packed bed. The SUS raschig ring had an outer diameter of 6 mm, an inner diameter of 5 mm, and a length of 6 mm (an average particle diameter of 8.5 mm). The raschig rings had a void percentage of about 90 volume percent. On the raschig ring packed bed, a solid catalyst was charged to form a solid catalyst packed bed. The solid catalyst used in the treatment contained an oxide of titanium and zirconium as a main component, a composite oxide thereof, and platinum at a weight ratio of 49.8:49.8:0.4 converted by $TiO_2:ZrO_2:Pt$. The solid catalyst had a shape of pellet having a diameter of 6 mm ø and a length of 8 mm (an average particle diameter of 10 mm). The solid catalyst in an amount of 500 liters was charged into a reaction tower to form a solid catalyst packed bed.

On the solid catalyst packed bed, balls constituted by SUS in the shape of sphere having an average diameter (an average particle diameter) of 8 mm were charged to the height of 200 mm to form a packed bed. The SUS balls had a specific gravity of about 7.9 $g/cm^3$, and a void percentage of about 39 volume percent.

The waste treatment was treated in the following steps. First, the waste water supplied through a waste water supplying line 10 was pressurized to flow at a flow rate of 2 $m^3/hr$ by a waste water supplying pump 3, and was sent toward the reaction tower. Then, the maximum temperature inside a reaction tower 1 was adjusted to 260° C. by a heat exchanger 2 through a bypass regulating valve 8. After that, the waste water was supplied into a reaction tower 1 from the bottom thereof. On the other hand, the air was supplied through an oxygen-containing gas supplying line 11, and then was pressurized by a compressor 4. The air was then supplied upstream of the heat exchanger 2 so that the ratio of $O_2/COD$ (Cr) (i.e. the amount of oxygen in the air/chemical oxygen demand) was 1.2, and was mixed with the waste water. The treated liquid obtained by the wet-oxidation treatment was introduced through a treated liquid line 12 to a cooler 9 so as to be cooled, and then, was subjected to a gas-liquid separation treatment in a gas-liquid separator 5. In the gas-liquid separator 5, the liquid surface was detected by a liquid surface controller (LC), and was kept to be constant by a liquid phase control valve 6. At the same time, the pressure of the liquid surface was detected by a pressure controller (PC), and was kept to 75 $kg/cm^2G$ by a pressure control valve 7. Then, the treated liquid was discharged through a treated liquid discharging line 14. At the initiation of the treatment, the inlet pressure (PI) of the reaction tower was 77 $kg/cm^2G$.

The waste water treated in Example 13 had COD (Cr) of 37 g/liter and pH of 5.8. The treated liquid obtained after the elapse of 500 hours from the initiation of the treatment had COD (Cr) of 0.7 g/liter and pH of 6.9. The inlet pressure (PI) of the reaction tower after the elapse of 500 hours from the initiation of the treatment was 77 $kg/cm^2G$.

After the elapse of 500 hours, the treatment was stopped, and the lower part of the reaction tower was opened and a part of the support member was detached to take out the raschig ring packed bed. No space was observed between the raschig ring packed bed and the solid catalyst packed bed. The solid catalyst was also taken out of the reaction tower to observe its shape. No change in the shape thereof was observed.

EXAMPLE 14

The Apparatus of Third Configuration

Waste water was treated for 500 hours by repeating the steps of Example 13 using of the same type of apparatus as used in Example 13, except for the following conditions.

In the reaction tower, a support member constituted by wire netting and grid was provided. On the support member, balls constituted by SUS in the form of sphere having a diameter of 8 mm were charge to the height of 100 mm to form a packed bed. The SUS balls had a void percentage of about 40 volume percent. On the SUS ball packed bed, the solid catalyst was charged. The solid catalyst used in the treatment contained an oxide of titanium and zirconium as a main component, a composite oxide thereof, and palladium at a weight ratio of 49.5:49.5:1.0 converted by $TiO_2:ZrO_2:Pd$. The solid catalyst had a shape of pellet having a diameter of 6 mm and a length of 8 mm (an average particle diameter of 10 mm). The solid catalyst in an amount of 500 liter was charged into the reaction tower. On the solid catalyst packed bed, a fixed pressure member for giving a pressure to the solid catalyst packed bed constituted by wire netting and a grid was provided.

The amount of the waste water supplied was 0.25 $m^3$/hr, and the ratio of $O_2$/COD (Cr) was adjusted to 1.5. The maximum temperature of the reaction tower was adjusted to 160° C., and the pressure of the pressure controller (PC) was controlled to 9.0 kg/$cm^2$G. The inlet pressure (PI) of the reaction tower at the initiation of the treatment was 9.8 kg/$cm^2$G.

The waste water treated in Example 14 had COD (Cr) of 25 g/liter and pH of 13.6. The treated liquid obtained after the elapse of 500 hours had COD (Cr) of 1.1 g/liter and pH of 12.8. After the elapse of 500 hours, the inlet pressure (PI) of the reaction tower was 9.8 kg/$cm^2$G.

After the elapse of 500 hours, the treatment was stopped and the lower part of the reaction tower was opened and a part of the support member was detached to take out the SUS ball packed bed. No space was observed between the SUS ball packed bed and the solid catalyst packed bed. The solid catalyst was also taken out of the reaction tower to observe its shape. The solid catalyst packed bed located at the upper part of the reaction tower was abraded to some extent.

Comparative Example 9

Waste water was treated by repeating the steps of Example 14, except that the solid catalyst was directly charged on the wire netting without providing SUS ball packed bed on the support member. The inlet pressure (PI) of the reaction tower at the initiation of the treatment was 9.8 kg/$cm^2$G.

The treated liquid obtained after the elapse of 500 hours had COD (Cr) of 1.2 g/liter and pH of 12.8. The inlet pressure (PI) of the reaction tower after the elapse of 500 hours was 10.2 kg/$cm^2$G.

After the elapse of 500 hours, the treatment was ø stopped. The lower part of the reaction tower was opened to observe the state of the solid catalyst. At the lower part of the solid catalyst packed bed, especially in the area with which the gas and liquid blown off from the nozzle collided, a space of about 130 mm in height direction was created. The solid catalyst located at the lower part of the reaction tower was abraded to be smaller in size. In addition, in the area of the solid catalyst about 400 mm above from the surface of the support member, the powdered solid catalyst was clogged. On the bottom surface of the reaction tower, a small amount of powdered solid catalyst was accumulated. The solid catalyst located at the upper part of the reaction tower was abraded to some extent.

EXAMPLE 15

The Apparatus of the Fourth Configuration

Figure 4:
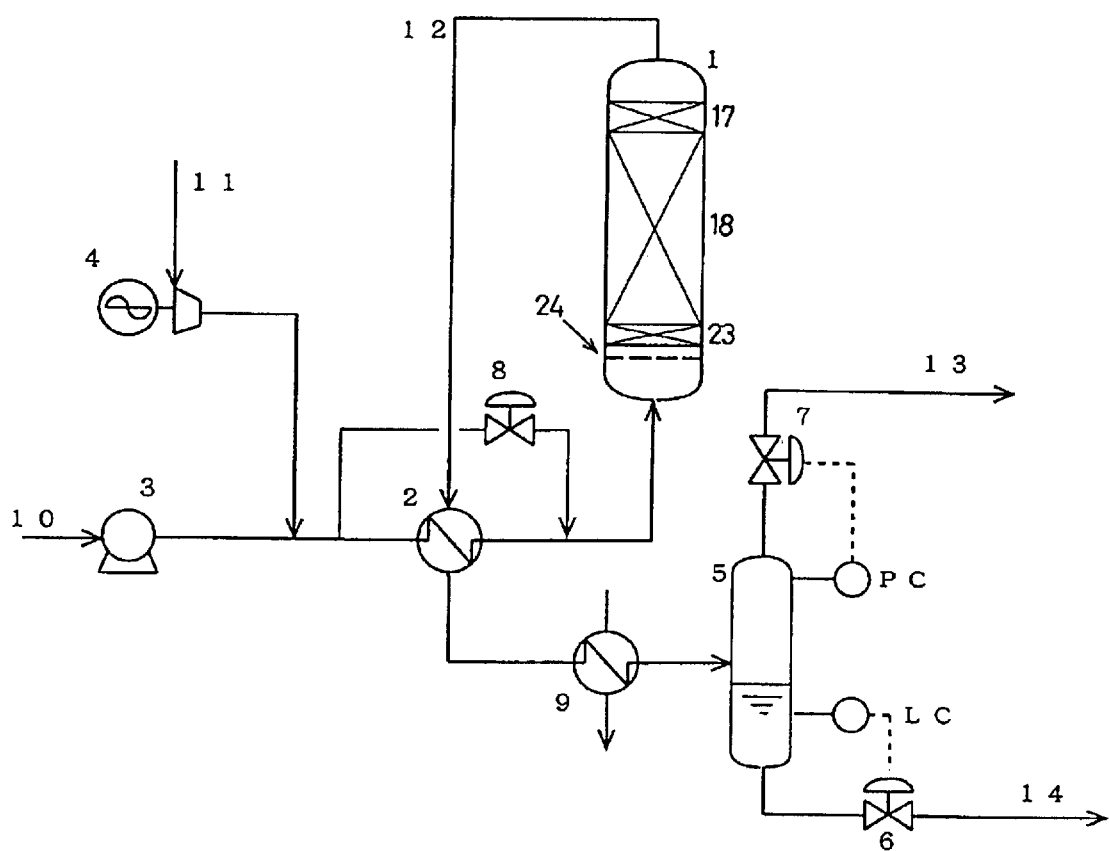
FIG. 4 is a schematic diagram showing still another method for treating waste water using an apparatus of the present invention.

Waste water was treated using the wet-oxidation treatment apparatus shown in FIG. 4 for 500 hours in total by repeating the steps of Example 13, except for the conditions described below.

In Example 15, the reaction tower used for treatment had a shape of cylinder having a diameter of 600 mm and a length of 7000 mm. At the lower part of the reaction tower, at the position 800 mm above from the bottom surface of the reaction tower, provided was a support member constituted by SUS wire netting of having six mesh (a wire diameter of 0.8 mm and an interval of segments of 3.43 mm) and a grid in order to support the weight of the solid catalyst. At the position 700 mm above from the bottom surface of the reaction tower, provided was a perforated plate 19 constituted by SUS having seven holes having a diameter of 15 mm ø. On the support member, balls constituted by SUS in the form of sphere having an average diameter (an average particle diameter) of 8 mm were charged to the height direction of 150 mm to form a packed bed. The SUS balls had a void percentage of about 40 volume percent.

On the SUS ball packed bed, a solid catalyst was charged. The solid catalyst contained an oxide of titanium and iron, and ruthenium at a weight ratio of 29.5:69.5:1.0 converted by $TiO_2:Fe_2O_3:Ru$. The solid catalyst had a shape of pellet having a diameter of 3 mm and a length of 5 mm (an average particle diameter of 5.8 mm). The solid catalyst in an amount of 1.5 $m^3$ was charged into the reaction tower.

On the solid catalyst packed bed, pellets constituted by SUS in the shape of circular column having a diameter of 6 mm and a length of 6 mm (an average particle diameter of 8.5 mm) were charged to the height of 250 mm to form a packed bed. The SUS pellets had a specific gravity of about 7.9 g/$cm^3$, and a void percentage of about 41 volume percent.

The amount of the waste water supplied was 3 $m^3$/hr, and the amount of the air supplied was adjusted so that the ratio of $O_2$/COD (Cr) was 1.05. The pressure inside the reaction tower was kept to 30 kg/$cm^2$G so that the maximum temperature therein was 200° C. The inlet pressure (PI) of the reaction tower at the initiation of the treatment was 32 kg/$cm^2$G.

The waste water treated in Example 15 had COD (Cr) of 22 g/liter and pH of 13.1. The treated liquid obtained after the elapse of 500 hours had COD (Cr) of 0.2 g/liter and pH of 12.3. The inlet pressure (PI) of the reaction tower after the elapse of 500 hours was 32 kg/$cm^2$G.

After the elapse of 500 hours, the treatment was stopped, and the lower part of the reaction tower was opened and a part of the perforated plate and a part of the grid was detached to take out the SUS ball packed bed. No space was observed between the SUS ball packed bed and the solid catalyst packed bed. The solid catalyst was also taken out of the reaction tower to observe its shape. The solid catalyst packed bed located at the upper part of the reaction tower was abraded to some extent.

Comparative Example 10

Waste water was treated by repeating the steps of Example 15, except the followings. That is, neither SUS pellet packed bed nor SUS ball packed bed was provided on and under the solid catalyst packed bed, and the solid catalyst packed bed was directly charged on the support member. In addition, a fixed pressure member constituted by SUS wire netting and grid was provided on the solid catalyst packed bed in such a manner as to create no space, in order to give pressure to the solid catalyst packed bed. The inlet pressure (PI) of the reaction tower at the initiation of the treatment was 32 kg/$cm^2$G.

Soon after the initiation of the treatment, the solid catalyst in the form of powder was discharged in the treated water. After the elapse of about 100 hours, the inlet pressure of the reaction tower increased to 36 kg/$cm^2$G, and the treatment was stopped. The lower part of the reaction tower was opened to detach a part of the perforated plate and a part of the support member to observe the inside state of the reaction tower. At the lower part of the solid catalyst packed bed, a space having a height of about 190 mm was created, and the solid catalyst was abraded to be smaller in size. At the part of the solid catalyst packed bed about 600 mm above from the surface of the support member, the powdered solid catalyst was clogged. On the bottom surface of the reaction tower, a little amount of powdered solid catalyst was accumulated.

EXAMPLE 16

The Apparatus of Third Configuration

Figure 5:
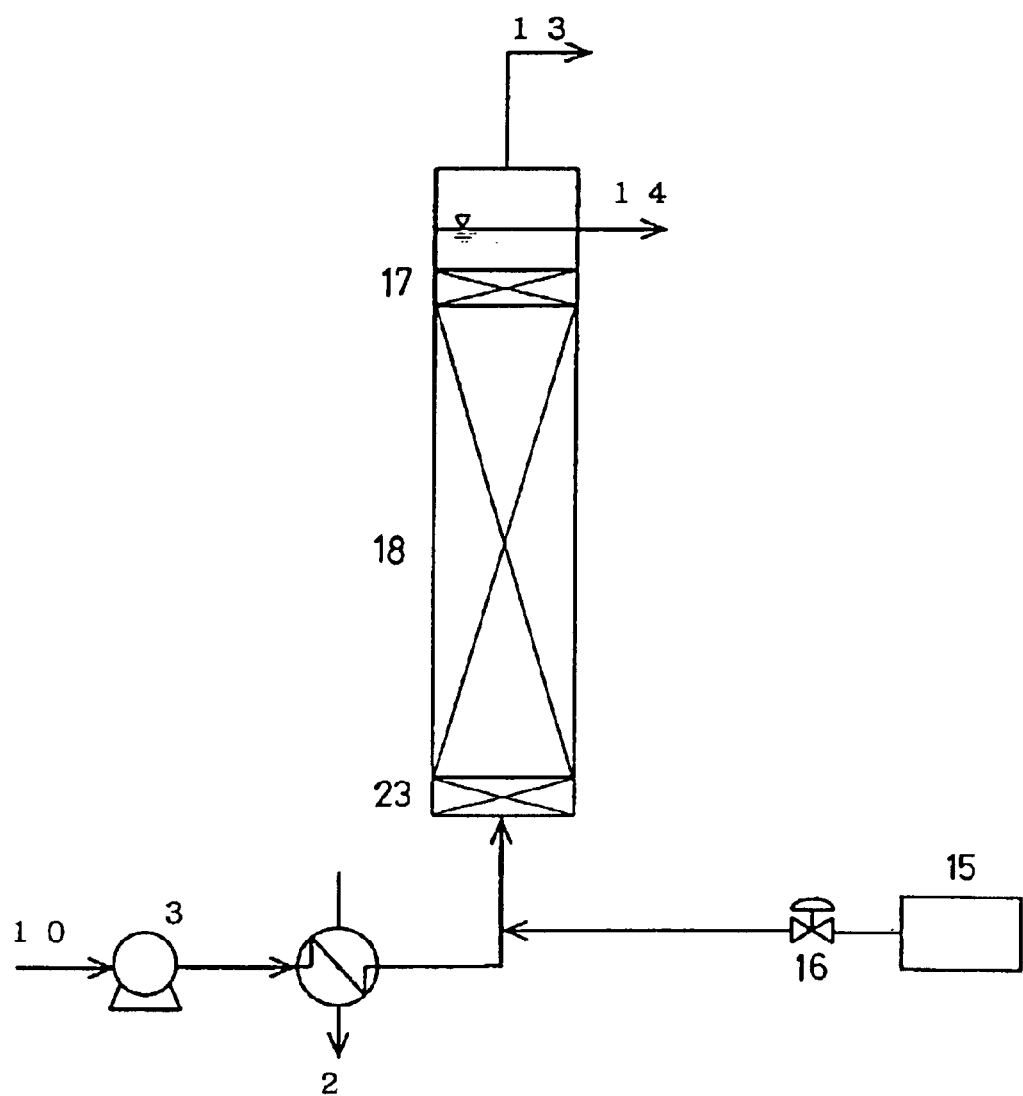
FIG. 5 is a schematic diagram showing still another method for treating waste water using an apparatus of the present invention.

Waste water was treated for 500 hours in total using the of ozone-oxidation treatment apparatus shown in FIG. 5 under the conditions described below.

The reaction tower used for treatment had a shape of cylinder having a inner diameter of 92 mm and a height of 6.0 m. To the center of the bottom surface of the reaction tower, a line (an inner diameter of 6 mm) for supplying waste water and ozone-containing gas was connected. At the lower part of the reaction tower, provided was a support member constituted by SUS wire netting having six mesh (a wire diameter of 0.8 mm and an interval of segments of 3.43 mm). On the wire netting, zirconia balls in the shape of sphere having an average diameter (an average particle diameter) of 10 mm were charged to the height of 50 mm to form a packed bed. The zirconia balls had a void percentage of about 40 percent.

On the zirconia ball packed bed, the solid catalyst was charged. The solid catalyst contained zirconium and manganese as main components and a composite oxide thereof at a weight ratio of 97:3 converted by $ZrO_2:MnO_2$. The solid catalyst had a shape of pellet having a diameter of 4 mm and a length of 6 mm (an average particle diameter of 7.2 mm). The solid catalyst in an amount of 30 liters was charged into a reaction tower to form a solid catalyst packed bed. On the solid catalyst packed bed, a fixed pressure member constituted by wire netting and grid was provided in order to give pressure to the solid catalyst packed bed.

The waste treatment was conducted in the following steps. First, the waste water supplied through a waste water supplying line 10, was pressurized to flow at a flow rate of 15 liter/hr by a waste water supplying pump 3. Then, the temperature of the waste water was adjusted to 25° C. by a heat exchanger 2 and was supplied into the reaction tower 1 from the bottom thereof. On the other hand, an ozone-containing gas (having an ozone concentration of 100 $g/m^3$) was generated by an ozone generator 15, and was controlled to flow at a flow rate of 0.26 $Nm^3/h$ by a gas flow rate regulating valve 21. Then, the gas was introduced into the reaction tower 1 from the bottom thereof.

The waste water treated in Example 16 had COD (Cr) of 490 mg/liter and pH of 6.8. The treated liquid obtained after the elapse of 500 hours from the initiation of the treatment had COD (Cr) of 25 mg/liter and pH of 5.9.

After the elapse of 500 hours, the treatment was stopped. The lower part of the reaction tower was opened, and the SUS wire netting was detached and the balls were taken out to observe the inner state of the reaction tower. No space was created between the ball packed bed and the solid catalyst packed bed. Then, the solid catalyst packed bed was also taken out of the reaction tower to observe its shape. The solid catalyst located at the upper part of the reaction tower was abraded to some extent.

Comparative Example 11

Waste water was treated by repeating the steps of Example 16, except that no zirconium balls were charged to the bottom of the reaction tower.

The treated liquid obtained after the elapse of 500 hours had COD (Cr) of 30 mg/liter and pH of 5.8.

After the elapse of 500 hours, the treatment was stopped. The lower part of the reaction tower was opened and the SUS wire netting was detached to observe the inside state of the reaction tower. A space having a height of about 60 mm was observed at the middle area of the reaction tower corresponding to the position of the top of the SUS wire netting. At the lower part of the reaction tower, the solid catalyst was abraded to be smaller in size. In addition, the packed catalyst in the form of powder was clogged to the height of about 300 mm above from the bottom surface of the reaction tower. The solid catalyst at the upper part of the reaction tower was abraded to some extent.

Industrial Applicability

Through use of the waste water treatment apparatus of the first configuration the present invention, the following effects can be obtained.

(1) On the solid catalyst packed bed, the water-permeable pressure layer (the upper deformation packed bed) having an ability of following up the deformation of the solid catalyst packed bed is provided. The water-permeable pressure layer effectively prevents the movement of the solid catalyst in the solid catalyst packed bed, thereby preventing the problem such as the abrasion of solid catalyst mainly caused by its movement, the deterioration of performance thereof, and in increase in pressure loss. With this structure, the apparatus can conduct the waste water treatment in a stable manner for a long period of time. In addition, the ability of treating waste water of the solid catalyst is kept to high level for a long period of time, and therefore, waste water can be highly purified at low cost.

(2) As compared with a conventional apparatus, waste water and/or gas can be allowed to flow at large flow, and the treatment conditions can be so determined. With this structure, larger amount of waste water can be treated. In addition, treatment efficiency can be enhanced by increasing the flow of the gas.

(3) By use of a reaction tower having a small diameter and a long length, it is possible to allow the waste water to flow through the solid catalyst packed bed at high linear velocity. The use of the reaction tower having a small diameter and a long length lowers equipment cost, and also makes it possible to highly purify the waste water. The apparatus of the first configuration also permits the use of a reaction tower having a large diameter which has caused many problems in a conventional apparatus. In addition, whereas in a conventional apparatus, a plurality of reaction towers have been arranged in parallel to each other, in the apparatus of the first configuration of the present invention, one reaction tower having a large diameter can be used. With this structure, the equipment cost of the reaction tower can be lowered.

(4) According to the present invention, the apparatus of the first configuration can be used under various conditions of waste water treatment, as compared with a conventional apparatus. Among various conditions and equipment, the optimum conditions and equipment can be selected. As a result, waste water can be efficiently treated in a stable manner for a long period of time.

(5) The apparatus of the first configuration of the present invention is especially effective in waste water treatment methods such as the wet-oxidation method, the wet-decomposing method, the ozone-oxidation method in which the above-described problems (1) to (3) have been remarkable. Among them, the apparatus is especially suitable for the wet-oxidation method in which waste water is treated while an oxygen-containing gas is supplied thereto in the presence of solid catalyst.

The apparatus of the second configuration of the present invention is very effective in the case where the reaction tower has a large cross-sectional area in a horizontal direction. Although the apparatus of the first configuration has the upper packed bed alone, the apparatus of the second configuration has a vertical partition which divides the upper pat of the solid catalyst packed bed and the upper packed bed into a plurality of segments. In each segment, the upper packed bed satisfactorily deforms in accordance with the sinking of the solid catalyst. By use of the vertical partition, the amount of the upper packed bed can be decreased. The apparatus of the second configuration increases the durability of the solid catalyst and/or solid adsorbent as compared with the apparatus of the first configuration. In addition, waste water can be highly purified at low cost.

According to the apparatus of the third configuration of the present invention, a layer for dispersing and mitigating the upward stream of waste water is provided under the solid catalyst packed bed. The dispersing and mitigating layer attains the following effect.

(1) The dispersing and mitigating layer effectively prevents the abrasion of solid catalyst caused by collision with waste water blown off from the nozzle, or the hole of the single-hole or perforated plate. With this structure, there is no problem such as the deterioration of performance of solid catalyst and an increase in pressure loss, and waste water can be treated in a stable manner for a long period of time. In addition, the ability of treating waste water of the solid catalyst is kept to high level for a long period of time, and therefore, the waste water can be highly purified at low cost.

(2) Even if the waste water is allowed to flow at large flow, the abrasion of solid catalyst can be effectively prevented. It is possible to employ the flow of the waste water which is set to be higher than that of a conventional treatment, and therefore, a large amount of waste water can be treated. In addition, the treatment efficiency can be enhanced by increasing the flow rate of the gas.

(3) The dispersing and mitigating layer disperses the waste water supplied to the solid catalyst, and prevents it from drifting. With this structure, the waste water can be supplied to the solid catalyst packed bed uniformly. As a result, the waste water treatment efficiency and the treatment capacity can be increased.

(4) The apparatus of the third configuration of the present invention is especially effective in waste water treatment methods such as the wet-oxidation method, the wet-decomposing method, the ozone-oxidation method in which the above-described problems (1) to (3) have been remarkable. Among them, the apparatus of the third configuration is especially suitable for the wet-oxidation method in which waste water is treated while an oxygen-containing gas is supplied thereto in the presence of solid catalyst.

In the apparatus of the fourth configuration of the present invention, the upper packed bed is provided on the solid catalyst packed bed, and the lower packed bed is provided under the solid catalyst packed bed. These packed beds attain not only the effects of the first configuration but also the effects of the third configuration, and therefore, the fourth configuration is very useful.

The fifth apparatus of the present invention has the same structure as of the fourth apparatus, except that a vertical partition divides the upper part of the solid catalyst packed bed and the upper packed bed into a plurality of segments. With this structure, all the effects of the first to fourth apparatus are attained, and therefore, the fifth configuration is very useful.

In the sixth apparatus of the present invention, the pressure layer having an ability of following up the movement of the solid catalyst packed bed (the upper movement packed bed) is provided on the solid catalyst packed bed. Even if the top surface of the solid catalyst packed bed deforms, for example sinks, the upper movement packed bed follows up the deformation and sinks accordingly. The pressure layer is effective in preventing the abrasion by the movement of solid catalyst caused by its movement The sixth apparatus is especially effective in the case where the reaction tower has a small inner diameter, specifically, about 300 mm or smaller (preferably 100 mm or smaller).

The seventh apparatus of the present invention has the same structure as of the sixth apparatus, except that the lower packed bed is provided under the solid catalyst packed bed. The seventh apparatus makes it possible to attain all the effects obtained from the lower packed bed and the upper packed bed, and therefore, is very useful.

What is claimed is:

1. A wet-oxidation treatment apparatus for treating waste water, comprising:

a packed bed of a solid catalyst and/or a solid adsorbent provided in the apparatus;

a liquid inlet provided in the apparatus below the packed bed and connected to a source of the waste water;

a liquid outlet which is provided in the apparatus above the packed bed and through which treated waste water is discharged from the apparatus; and a water-permeable pressure layer provided on an upper surface of the packed bed and having a load enough to suppress a movement of the solid catalyst and/or the solid adsorbent, the water-permeable pressure layer being deformable according to a deformation of the upper surface of the packed bed, wherein the water-permeable pressure layer is a substance having a plurality of rigid particles selected from the group consisting of stainless steel, titania and zirconia.

2. The apparatus according to claim 1, wherein each of the rigid particles has an average diameter of 3 to 30 mm.

3. The apparatus according to claim 1, further comprising:

a vertical partition having a height of 20 to 300 cm in a vertical direction.

4. An apparatus according to claim 1, further comprising:

a layer provided under the packed bed and above the liquid inlet and configured to disperse an upward stream of the waste water and/or a waste gas introduced through the liquid inlet into the apparatus.

5. The apparatus according to claim 4, further comprising:

a vertical partition configured to divide a boundary area between an upper part of the packed bed and the pressure layer into a plurality of respective segments formed in a vertical direction.

6. The apparatus according to claim 5, wherein the respective segments formed by the vertical partition have a cross-sectional area of 50 to 5000 $cm^2$.

7. The apparatus according to claim 5, wherein the vertical partition has a height of 20 to 300 cm in a vertical direction.

8. The apparatus according to claim 1, further comprising:
   a vertical partition configured to divide a boundary area between an upper part of the packed bed and the pressure layer into a plurality of respective segments formed in a vertical direction.

9. The apparatus according to claim 8, wherein the respective segments formed by the vertical partition have a cross-sectional area of 50 to 5000 cm$^2$.

10. A wet-oxidation treatment apparatus for treating waste water, comprising:
    a packed bed of a solid catalyst and/or a solid adsorbent provided in the apparatus;
    a liquid inlet provided in the apparatus below the packed bed and connected to a source of the waste water;
    a liquid outlet which is provided in the apparatus above the packed bed and through which treated waste water is discharged from the apparatus; and
    a layer provided under the packed bed and above the liquid inlet and configured to disperse an upward stream of the waste water and/or a waste gas introduced through the liquid inlet into the apparatus,
    wherein the layer is a substance having a plurality of rigid particles selected from the group consisting of stainless steel, titania and zirconia.

11. An apparatus according to claim 10, wherein each of the rigid particles has an average diameter of 3 to 30 mm.

12. A wet-oxidation treatment apparatus for treating waste water, comprising:
    a container;
    a packed bed of a solid catalyst and/or a solid adsorbent provided in the container;
    a liquid inlet provided in the container below the packed bed and connected to a source of the waste water;
    a liquid outlet which is provided in the container above the packed bed and through which treated waste water is discharged from the container;
    a water-permeable pressing layer provided on an upper surface of the packed bed and having a load enough to suppress a movement of the solid catalyst and/or the solid adsorbent, the water-permeable pressing layer being deformable according to a deformation of the upper surface of the packed bed and having a plurality of rigid particles; and
    a layer which is provided under the packed bed and above the liquid inlet and which is configured to disperse an upward stream of the waste water introduced through the liquid inlet into the container, the layer having a plurality of rigid metal particles.

* * * * *